United States Patent
Song

(10) Patent No.: US 9,518,556 B2
(45) Date of Patent: Dec. 13, 2016

(54) APPARATUS AND SYSTEM FOR CONVERTING WAVE ENERGY BASED ON OSCILLATING WATER COLUMN TYPE

(71) Applicant: Seung Kwan Song, Seoul (KR)

(72) Inventor: Seung Kwan Song, Seoul (KR)

(73) Assignee: Seung Kwan Song, Seoul (KR)

( * ) Notice: Subject to any disclaimer, the term of this patent is extended or adjusted under 35 U.S.C. 154(b) by 371 days.

(21) Appl. No.: 14/226,836

(22) Filed: Mar. 27, 2014

(65) Prior Publication Data
US 2015/0226175 A1    Aug. 13, 2015

(30) Foreign Application Priority Data

Feb. 7, 2014 (KR) .................. 10-2014-0013970

(51) Int. Cl.
*F16D 31/02* (2006.01)
*F03B 13/14* (2006.01)
*F03B 13/24* (2006.01)

(52) U.S. Cl.
CPC ............. *F03B 13/142* (2013.01); *F03B 13/24* (2013.01); *Y02E 10/32* (2013.01); *Y02E 10/38* (2013.01)

(58) Field of Classification Search
CPC ....... F03B 13/142; F03B 13/148; F03B 13/24; Y02E 10/32
See application file for complete search history.

(56) References Cited

U.S. PATENT DOCUMENTS

| 4,441,316 A | 4/1984 | Moody |
| 4,719,754 A * | 1/1988 | Nishikawa ............ F03B 13/142 60/398 |
| 4,858,434 A | 8/1989 | Masuda |
| 7,525,213 B2 * | 4/2009 | Nagata .................... F03B 13/24 290/53 |

FOREIGN PATENT DOCUMENTS

WO    2008/149084 A2    12/2008

OTHER PUBLICATIONS

R. Sabzehgar, M. Moallem, "A review of ocean wave energy conversion systems," in IEEE Electr. Power Energy Conf., 2009, pp. 1-6.
K. Ruehl, D Bull, "Wave energy development roadmap: design to commercialization," in Proc. OCEANS Conf., 2012, pp. 1-10.
(Continued)

*Primary Examiner* — Michael Leslie
(74) *Attorney, Agent, or Firm* — Mintz Levin Cohn Ferris Glovsky and Popeo, P.C.; Kongsik Kim; Colleen H. Witherell

(57) ABSTRACT

Provided herein is an oscillating water column type wave energy converting apparatus that is suspended underwater by a mooring device and system thereof, the apparatus and system comprising an damping plate connected to the mooring device; a post with a hollow of which both ends are open, the post extending vertically upwards from the mooring device; a turbine disposed inside the hollow of the post; and a housing of which its lower end is open and which is disposed at an upper portion of the post, wherein the turbine is rotated by air that flows according to changes in water level inside the hollow of the post.

27 Claims, 20 Drawing Sheets

(56) References Cited

OTHER PUBLICATIONS

A. Muetez, J. G. Vining, "Ocean wave energy conversion—a survey," in Proc. IEEE Conf. Ind. Appl./41st Ind. Appl. Soc. Annu. Meeting, Oct. 2006, vol. 3, pp. 1410-1417.

H. Polinder, M. Damen, and F. Gardner, "Design, modelling and test results of the AWS PM linear generator," in European Trans. on Electrical Power, vol. 15, pp. 245-256, 2005.

M. G. de Sousa Prado, F. Gardner, M. Damen, and H. Polinder, "Modelling and test results of the Archimedes wave swing," in Proc. Inst. Mech. Eng. Part A, J. Power Energy, vol. 220, No. A8, pp. 855-868, 2006.

D.G. Dorrell, J.R. Halliday, P. Miller, and M. Findlater, "Review of wave energy resource and oscillating water column modelling," in 39th Int. Univ. Power Engineering Conf., 2004, vol. 1, pp. 649-653.

D. G. Dorrell, M.-F. Hsieh, "Performance of Wells turbines for use in small-scale oscillating water columns," in Proc. ISOPE, Vancouver, 2008, pp. 393-400.

K. Ruehl, T. Brekken, B. Bosma, and R. Paasch, "Large-Scale Ocean Wave Energy Plant Modeling," in IEEE CITRES., Waltham, 2010, pp. 379-386.

\* cited by examiner

APPARATUS AND SYSTEM FOR CONVERTING WAVE ENERGY BASED ON OSCILLATING WATER COLUMN TYPE

BACKGROUND OF THE INVENTION

1. Field of the Invention

Methods and apparatuses consistent with the exemplary embodiments relate to an apparatus and system for converting wave energy based on oscillating water column type, and more particularly to an oscillating water column type apparatus for converting wave energy that may be installed in a simple structure under water by satisfying resonance conditions depending on only a hydraulic spring constant and added mass by movement of water, and a system thereof.

2. Description of the Prior Art

Of ocean energies, wave energy refers to the oscillating energy of seawater caused by wind. Waves refer to the reciprocating movement of seawater moving up and down or left and right, which are different from tidal currents. Wave power generation refers to getting electric energy from wave energy, and is currently in the spotlight as a future environmentally friendly energy source. More specifically, periodical up and down movements caused by waves or front and back movements of water particles are converted into mechanical kinetic energy, and then converted into electric energy.

The aforementioned energy converting apparatuses may be broadly classified into two types: movable body type energy converting apparatuses and oscillating water column type energy converting apparatuses. The former type apparatuses obtain energy by movement of the floating body itself such as up-and-down movement or rotational movement of the floating body, whereas the latter type apparatuses obtain energy by air flow caused by the up-and-down movement of the water column inside the air chamber according to waves.

The energy converting apparatus according to the present invention belongs to the latter type, that is the oscillating water column type energy converting apparatuses, but it operates in another unique method, unlike conventional oscillating water column type energy apparatuses. Conventional oscillating water column type energy apparatuses are broadly classified into fixed type apparatuses such as U.S. Pat. No. 4,441,316 A and WO 2008/149084, and floating type apparatuses such as U.S. Pat. No. 4,858,434 A, whereas the energy converting apparatus of the present invention has a big difference since it is a submersible oscillating water column type energy converting apparatus that is based on changes in water pressure of the lower part of the housing that is relatively near the water surface.

Such an oscillating water column type energy converting apparatus generally has a shape of a buoy, and the resonance frequency corresponding to the movement of waves is determined according to its shape and mass. The buoy also makes vibratory movement according to the movement of waves, and the energy is converted into electric energy through a generator.

However, conventional oscillating water column type energy converting apparatuses are installed on the surface of water, and may thus be easily damaged or swept away in cases of by marine disasters such as storms and tidal waves etc. Furthermore, conventional energy converting apparatuses such as those disclosed in International Patent Publication WO 2008/149084 (published on Dec. 11, 2008) need a pressure adjustment apparatus and an additional spring in order to match the peak period of the waves of the sea where the apparatus is installed to the unique period of the apparatus. Herein, since additional mechanical components such as a bushing and an LM (Linear Motion) for restricting the movement of the apparatus are needed, the structure becomes complicated. Furthermore, conventional energy converting apparatuses such as those disclosed in International Patent Publication in WO 2008/149084 (published on Dec. 11, 2008) cannot be suspended in water because the direction of water pressure acting on the main body is vertically downwards.

SUMMARY OF THE INVENTION

The purpose of the present disclosure is to resolve the aforementioned problems, that is to provide an oscillating water column type wave energy converting apparatus having a simple structure made in a kinematic design method which satisfies resonance conditions based on only a hydraulic spring constant and added mass caused by movement of water, and a system thereof.

Furthermore, another purpose of the present disclosure is to provide an oscillating water column type wave energy converting apparatus where water pressure acts vertically upwards to the main body, thereby suspending the main body underwater, and a system thereof.

The problems that the present disclosure intended to resolve are not limited to the abovementioned problems, and other problems will be clearly understandable by those skilled in the art from the following disclosure.

According to an aspect of the present disclosure, there is provided an oscillating water column type wave energy converting apparatus that is suspended underwater by a mooring device, the apparatus comprising: an damping plate connected to the mooring device; a post with a hollow of which both ends are open, the post extending vertically upwards from the mooring device; a turbine disposed inside the hollow of the post; and a housing of which a lower end is open, the housing disposed at an upper portion of the post, wherein the turbine is rotated by air flow according to changes in water level inside the hollow of the post.

According to another aspect of the present disclosure, there is provided an oscillating water column type wave energy converting system, the system comprising: a wave energy converting apparatus comprising a housing of which a lower end is open, an damping plate comprising an insertion hole, a post having a hollow inserted into the insertion hole of the damping plate and extended to an inner space of the housing, and a turbine disposed inside the hollow of the post and is rotated by air flow according to changes in water level inside the hollow; and a mooring device that fixates the wave energy converting apparatus and prevents the wave energy converting apparatus from drifting away.

According to the present disclosure, there is no need for an additional component such as a buoy for converting kinetic energy of waves into mechanical energy, and thus it is possible to realize a simple structure having a low dry weight.

Furthermore, there is no need for a pressure adjustment apparatus for matching the peak period of the waves of the sea where the apparatus is installed with the unique period of the apparatus or an additional spring, and it is possible to match the unique period of the apparatus with the peak period of the waves of the sea of installation based on only a hydraulic spring constant and added mass caused by movement of water.

Furthermore, since flow of fluid is concentrated on one place due to the kinematic design, it is possible to maximize the amplitude, thereby guaranteeing a fast movement performance. Accordingly, it is possible to achieve a high energy conversion efficiency even when using a small generator.

In addition, since there is no need to secure additional space for a chamber for resonance conditions, it is possible to reduce the volume, obtain a high volumetric efficiency, and further, it is possible to reduce the risk of damage and loss caused by limitation factors such as waves.

Furthermore, since the direction of water pressure acting on the main body is vertically upwards, the main body may be suspended underwater, thereby saving installation costs.

In addition, it is possible to realize a low dry weight, simple structure, and high volumetric efficiency, thereby reducing the manufacturing costs, and since the dry weight is low, it becomes easy to transfer the apparatus, and since the components are made of pipes, repair and maintenance is also easy.

BRIEF DESCRIPTION OF THE DRAWINGS

The above and/or other aspects of the present disclosure will be more apparent by describing certain present disclosure with reference to the accompanying drawings, in which.

DETAILED DESCRIPTION

Figure 1:
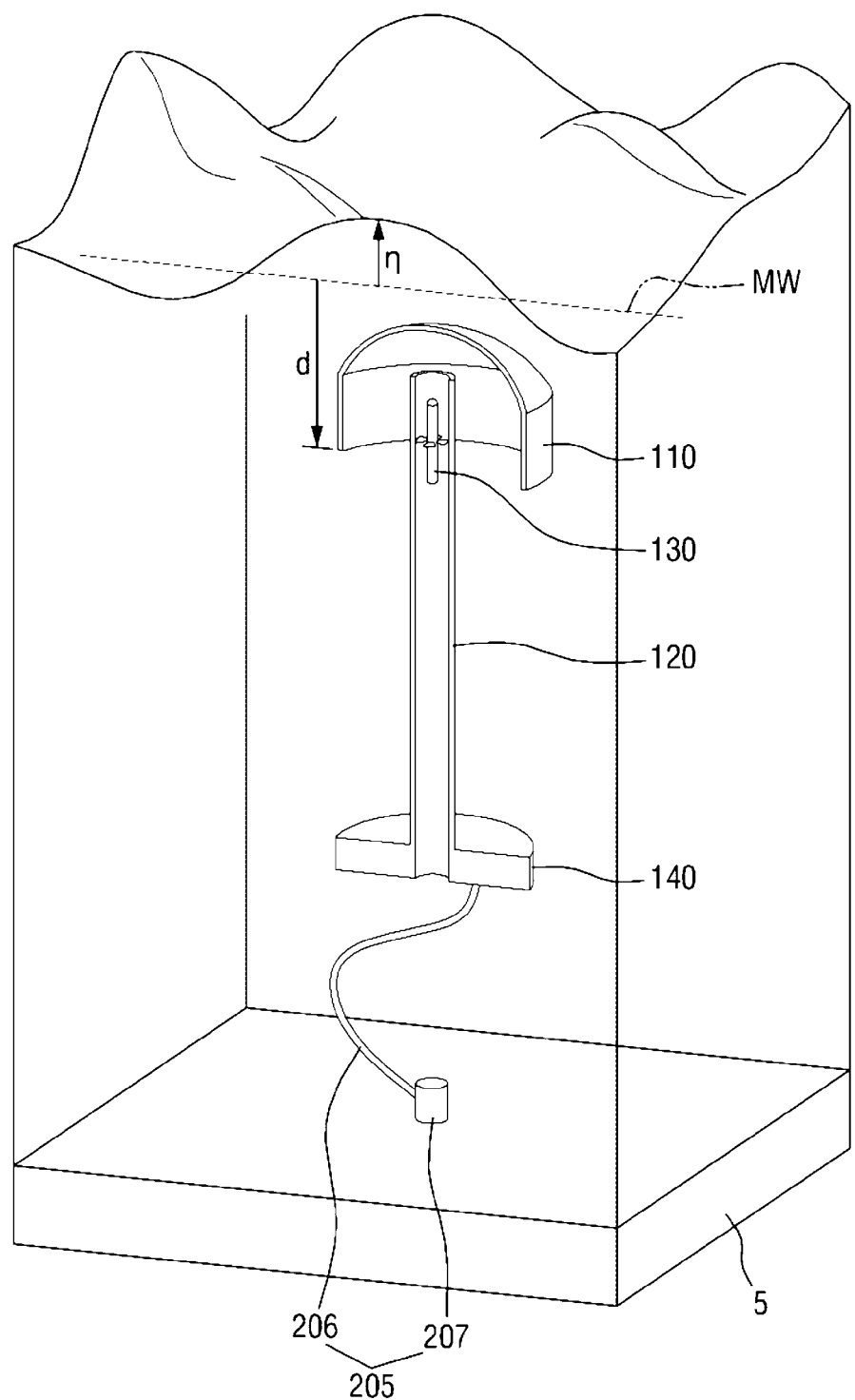
FIG. 1 is a cut skewed view of an oscillating water column type wave energy converting apparatus according to an exemplary embodiment of the present disclosure.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a cut skewed view of an oscillating water column type wave energy converting apparatus according to an exemplary embodiment of the present disclosure.

Referring to FIG. 1, an oscillating water column type energy converting apparatus 100 according to an exemplary embodiment of the present disclosure is disposed underwater by a mooring device 205, and consists of a housing 110, post 120, damping plate 140, and turbine 130. More specifically, an oscillating water column type wave energy converting apparatus 100 according to an exemplary embodiment of the present disclosure is suspended underwater by a mooring device 205, and consists of an damping plate 140 that is connected to the mooring device 205, a post 120 having a hollow of which both ends are open and that extends vertically upwards from the mooring device 205, a turbine 130 disposed at the hollow of the post 120, and a housing 110 having an open lower end and is disposed in an upper portion of the post 120. The turbine 130 is rotated by air that flows according to changes in water level in the hollow of the post 120. Furthermore, an oscillating water column type wave energy converting apparatus 100 according to an exemplary embodiment of the present disclosure may further comprise a generator (not illustrated) that is connected to the turbine 130 and generates electricity by rotation of the turbine 130. In addition, the mooring device 205 may comprise a support 207 that is installed on a sea bottom 5 and a connecting member 206 that connects the support 207 and the oscillating water column type wave energy converting apparatus 100, but applying any other type of mooring device 205 instead would be obvious for those skilled in the art.

In order to realize an oscillating water column type energy converting apparatus 100 having a simple structure with a housing 110, post, 120, damping plate 140, and turbine 130, the damping plate 140 may comprise an insertion hole through which the post 120 may be inserted and combined. Through one end of the post 120 connected to the insertion hole of the damping plate 140, water may flow in and out freely. There is no limitation to the shape of the damping plate 140, but it may preferably have a discal shape. Furthermore, the post 120 may also be extended in a longitudinal direction and there is no limitation to the shape of the cross-section of the post 120, but it may preferably have a cylinder shape. In addition, the turbine 130 may rotate in one direction only in order to obtain the maximum extraction according to the flow of air or water inside the post 120. For example, a wells turbine may be installed inside the post 120 and be rotated in one direction only. Of course, other types of turbines 130 may also be used instead, for example an impulse turbine. The housing 110 may be located in the upper part of the post 120, have a greater diameter than the post 120, and may surround a portion of the upper end of the post 120. The housing 110 disposed as such would contain air in it, and the air in the housing 110 would establish an equilibrium state with the water pressure.

For example, the housing 110 may have a cylinder shape, and its upper part may be blocked while its lower part is open. Furthermore, the post 120 may be a hollow cylinder of which both ends are open, the diameter of the post 120 being smaller than the housing 110, and the upper end of the post 120 may be disposed roughly in the center of the housing 110. The damping plate 140 may be a discal-shaped weight pendulum fixated to the lower end of the post 120. The damping plate 140 may increase the movement stability of the structure consisting of the housing 110 and the post 120, and restrict the movement of the structure caused by waves. That is, the housing 110, post 120, turbine 130, and damping plate 140 may all be relatively fixated, while the fluid inside the housing 110 and the turbine 130 moves freely.

Accordingly, an oscillating water column type wave energy converting apparatus 100 according to an exemplary embodiment of the present disclosure is capable of satisfying resonance conditions based on characteristics of seawater with a simple structure, and thus does not need additional devices. Furthermore, it is possible to drive a generator by concentrating the flow of fluid on one place, and also use the water pressure acting vertically upwards.

Hereinbelow is detailed explanation on operational principles of an oscillating water column type wave energy converting apparatus 100 according to an exemplary embodiment of the present disclosure.

Figure 2:
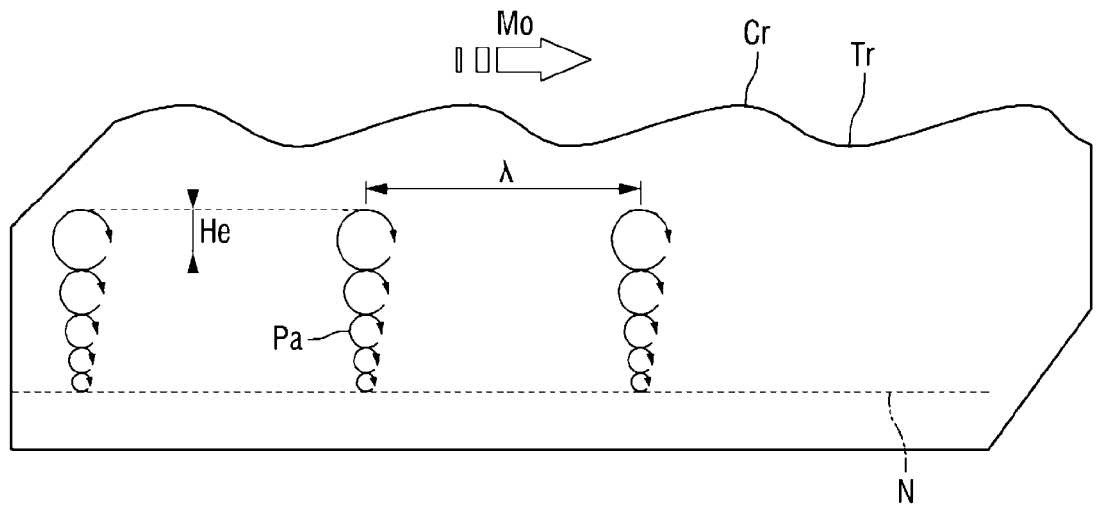
FIG. 2 is a view illustrating hydraulic pressure oscillation caused by waves.
Figure 3:
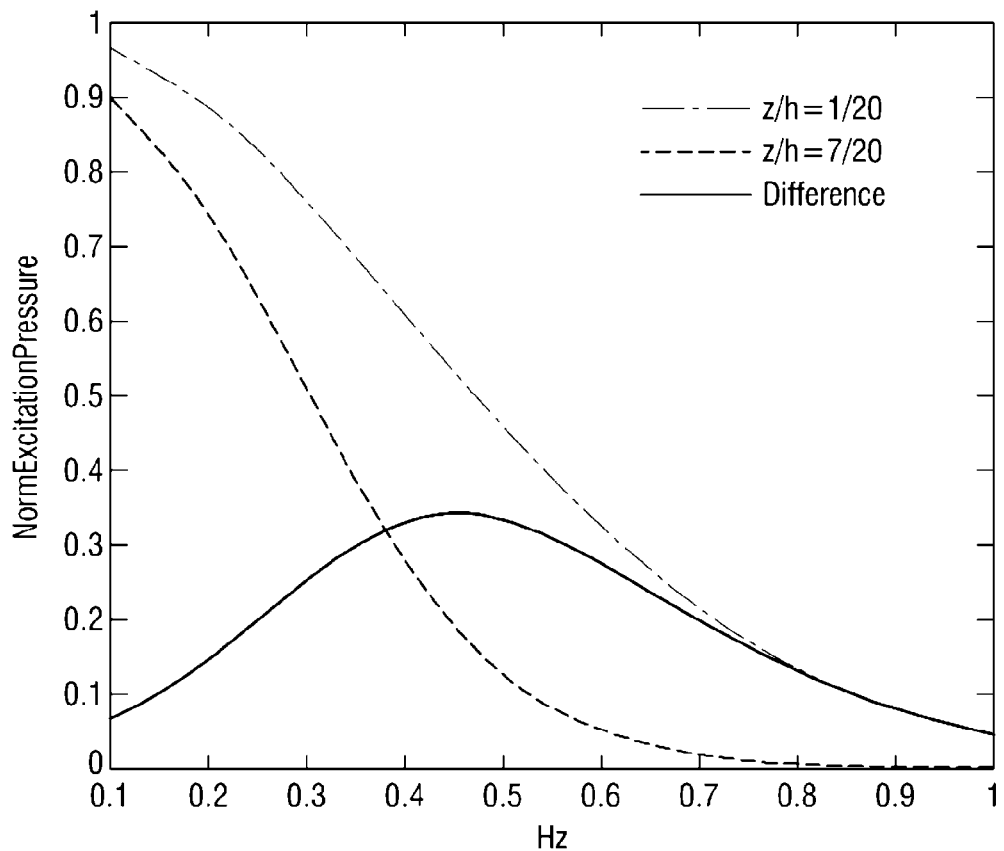
FIG. 3 is a graph showing changes in excitation pressure for frequency areas per depth.

FIG. 2 is a view illustrating hydraulic pressure oscillation caused by waves, and FIG. 3 is a graph showing changes in excitation pressure for frequency areas per depth.

With reference to FIG. 2, due to oscillation of water on sea surface caused by wind, waves make circular orbital periodic movements (Pa). There is a characteristic that the closer it is to the sea surface, the greater the circular orbit, and the deeper the water, the smaller the circular orbit. That is, the closer it is to the sea surface, greater changes occur in the sea water pressure by waves, and the deeper the water, smaller changes occur in the sea water pressure by waves. And changes in water pressure occur up to a depth that is approximately a half of a wavelength (λ) of the waves.

The degree of change in water pressure according to the water depth with respect to the mean water level (z) may be induced from the Helmholtz equation and may be denoted as math equation 1 below.

$$e(kz) = \frac{\cosh(kh-kz)}{\cosh(kh)} \quad \text{[Math equation 1]}$$

Herein, h represents the total water depth of the sea bottom, $$k\left(=\frac{2\pi}{\lambda}\right)$$

the wave number which is in inverse proportion to the wavelength of the wave.

In the above math equation 1, as the water depth (z) increases, e(kz) decreases. Furthermore, the wavelength and period (T) of the wave have a correlation as in math equation 2 below.

$$w^2 = gk \tan h(kh) \quad \text{[Math equation 2]}$$

Herein, $$w = \frac{2\pi}{T},$$

g being the acceleration of gravity.

The longer the period of the wave (or the lower the oscillation frequency), k that satisfies math equation 2 has a smaller value, and e(kz) becomes insensitive to the changes of z. Therefore, the longer the period of the waves, the energy of the waves can be transferred to a more deeper water, and the shorter the period of the waves, the energy of the waves cannot be transferred to deeper water.

FIG. 3 is a view illustrating this tendency. FIG. 3 is quantification of excitation pressure which is the force applied by waves. Herein, the closer to 1, it means that all force of wave is transferred. Dotted line ———— represents the case where the depth is ½₀ of the water depth of the sea bottom, and the dotted line represents changes in excitation pressure caused by the frequency at a depth that is 7/20 of the sea bottom. From the two graphs, one can see that in the case of a low frequency, that is a long period wave, both show 0.9 or more transferring power, but the greater the frequency, the less the degree of the frequency. As the sea gets deeper, the degree of attenuation increases, and the solid line shows the difference between the two values. This value has the maximum value at approximately 0.45 Hz, and it is possible to match the extreme value of the difference of the excitation force to the wave period of the sea area where the apparatus is installed to maximize the extraction and use oscillating water column type wave energy converting apparatus 100.

Figure 4A:
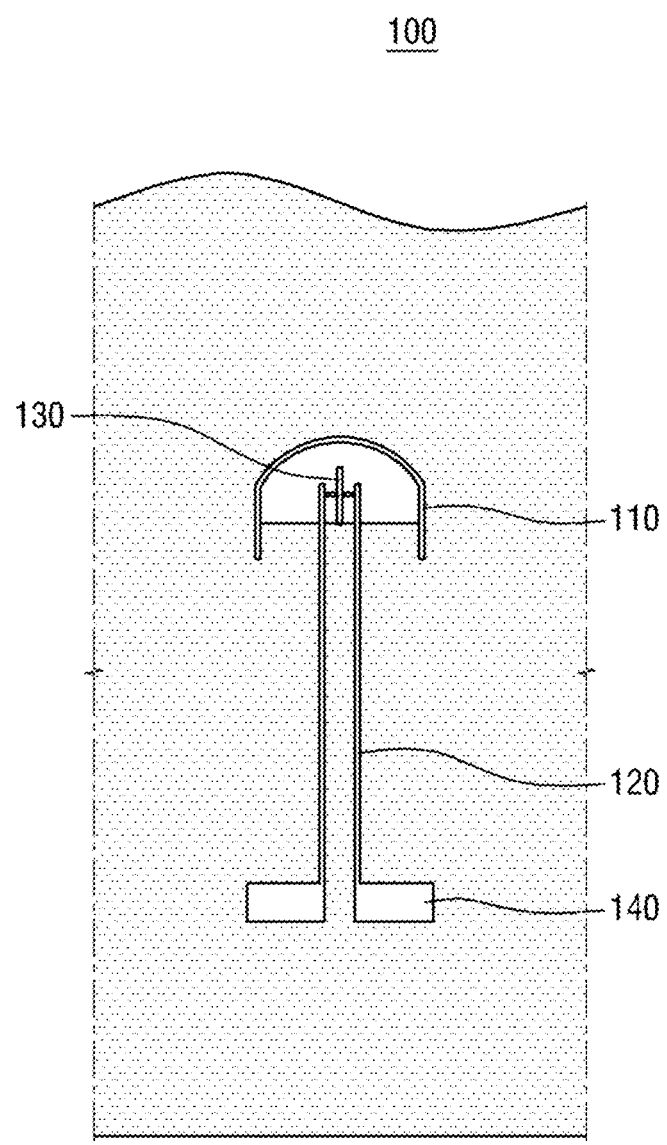
FIG. 4a is a cross-sectional view illustrating an oscillating water column wave energy converting apparatus of FIG. 1 when a wave height is at an equilibrium state.
Figure 4B:
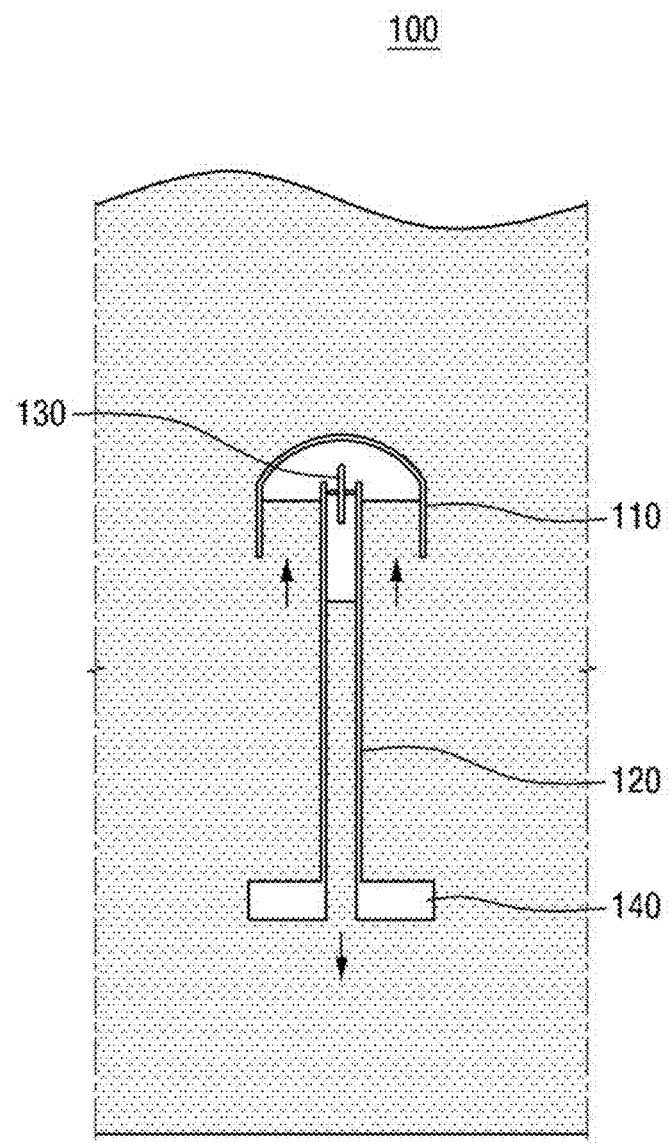
FIG. 4b is a cross-sectional view illustrating an oscillating water column wave energy converting apparatus of FIG. 1 when a wave height is at an rising state.
Figure 4C:
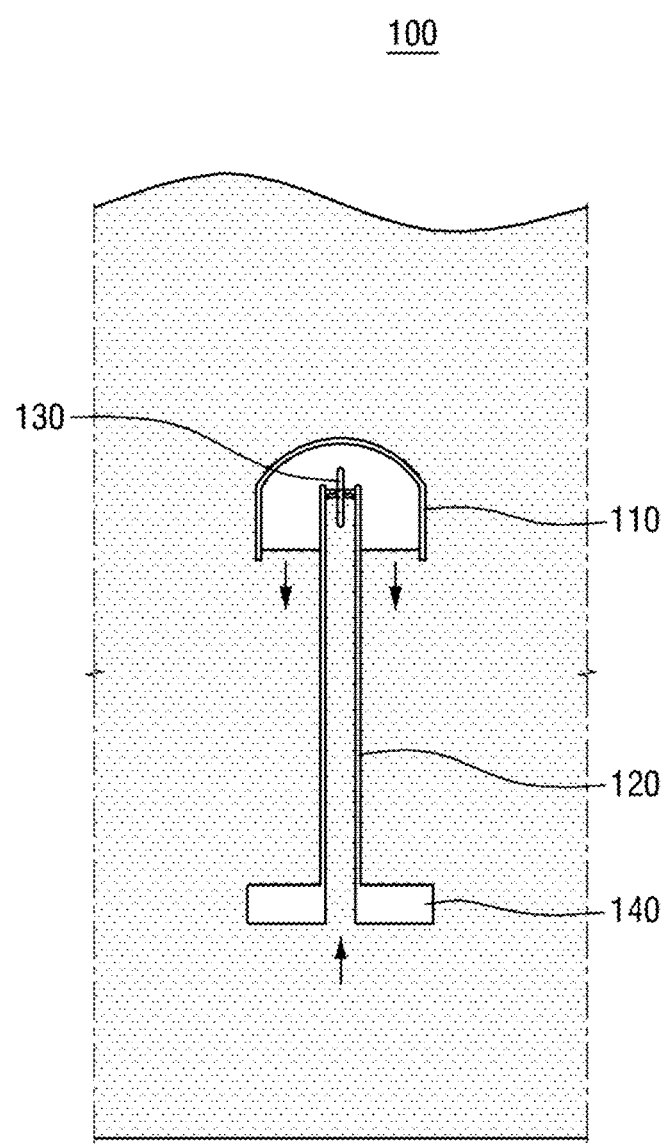
FIG. 4c is a cross-sectional view illustrating an oscillating water column wave energy converting apparatus of FIG. 1 when a wave height is at a dropping state.

FIG. 4a is a cross-sectional view illustrating an oscillating water column type wave energy converting apparatus of FIG. 1 when a wave height is at an equilibrium state, FIG. 4b is a cross-sectional view illustrating an oscillating water column wave energy converting apparatus of FIG. 1 when a wave is at a rising state, and FIG. 4c is a cross-sectional view illustrating an oscillating water column type wave energy converting apparatus of FIG. 1 when a wave is at a dropping state.

As illustrated in FIG. 4a, when there is no wave, the water level inside the housing 110 and the water level inside the post 120 maintain an equilibrium state of the same water level.

As illustrated in FIG. 4b, when a wave height rises, the sea water pressure at the lower end of the housing 110 and the sea water pressure at the lower end of the post 120 increase. However, as illustrated in the graph in FIG. 3, due to the difference of excitation force, the rising ratio of the sea water pressure acting on the housing 110 is greater than the rising ratio of the sea water pressure acting on the lower end of the post 120, pushing the sea water inside the post 120 downwards.

As illustrated in FIG. 4c, as the wave height drops, the drop of sea water pressure inside the housing 110 is greater, and thus a negative pressure occurs inside the housing 110, resulting in a rise of the sea water inside the post 120. Herein, in the case where the sea water inside the post 120 rises to the maximum level, the sea water is discharged outside the post 120.

As the wave height repeats its rising and dropping, the air inside repeats rising and dropping, thereby rotating the turbine 130 due to the up and down movement of air. That is, since the displacement of the sea water existing in the housing 110 and the post 120 is in inverse proportion to the cross-sectional area of the housing 110 and the post 120, the displacement of the sea water inside the post 120 oscillate more significantly than the displacement of the sea water inside the housing 110. Therefore, the turbine 130 inside the post 120 becomes rotatable at a fast speed by the amplified fluid speed, thereby enhancing the efficiency of the generator.

Herein, the water existing inside the housing 110 and the post 120 becomes capable of transferring the sea water pressure and the role of weight pendulum for satisfying resonance conditions. In order to satisfy the resonance conditions, math equation 3 must be satisfied where the peak period of the wave corresponds to the resonance frequency of the oscillating water column type wave energy converting apparatus 100.

$$T_{wave} = 2\pi \sqrt{\frac{M_{tot}}{K_{tot}}} \quad \text{[Math equation 3]}$$

Herein, $T_{wave}$ represents the peak period, $M_{tot}$ the total mass of the oscillating water column type wave energy converting apparatus 100, and $K_{tot}$ the spring effect of the entirety of the oscillating water column type wave energy converting apparatus 100. Herein, the letters and/or numbers following the under bar (_) represent the subscript below, and hereinafter the under bar is used for the same meaning.

In prior art, artificial structures were used to increase the mass of the apparatus or spring constants were controlled, but in the proposed oscillating water column type wave energy converting apparatus 100, the mass and buoyancy of sea water are used, and these values are affected by the length of the post 120 and the cross-sectional area of the housing 110. Thus, the proposed apparatus 100 may be realized in a simple structure by geometric configuration designing.

Figure 5:
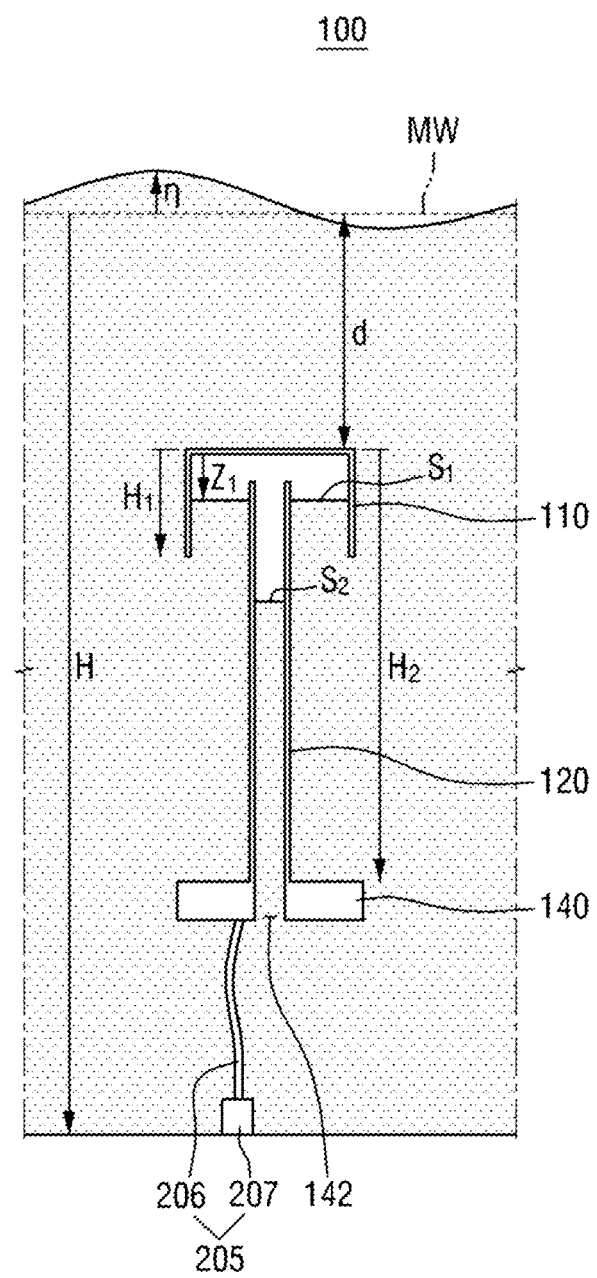
FIG. 5 is a partial cross-sectional view of an oscillating water column type wave energy converting apparatus of FIG. 1.

FIG. 5 is a partial cross-sectional view of an oscillating water column type wave energy converting apparatus of FIG. 1.

In FIG. 5, MW represents an average water surface level, η a wave displacement, d an installation depth, h an installation water depth, $z_1$ an inner water level of the housing 110, $S_1$ a cross-sectional area of the housing 110, $H_1$ a height of the housing 110, an inner water level of the post 120, a cross-sectional area of the post 120, and $H_2$ a height of the post 120.

In the case of a conventional general buoy type wave energy converting apparatus, a unique frequency is determined by the size and weight of the buoy, and the spring connected to the buoy. On the other hand, the proposed oscillating water column type wave energy converting apparatus 100 does not have a separate moving part but depends on only the flow of sea water, and thus the resonance period is determined by the mass effect caused by the flow quantity of the sea water and the spring effect provided by the hydrostatic force. The mass effect includes added mass (hereinafter referred to as 'added mass') that affects from outside the housing 110 and post 120, and the mass by the flow that moves inside the housing 110 and post 120 (hereinafter referred to as 'flow mass').

In the case of added mass, there is the added mass that affects the area surrounding the housing 110 by the oscillation of the water inside the housing 110, and the added mass that affects the water surrounding the post 120 by the movement of water at the lower end of the post 120. In the case of such added mass, its size and tendency of frequency cannot be obtained directly, but can be calculated by using a partial differentiation equation by the navier-stokes theory. On the other hand, in the case of flow mass, since an assumption is made of the movement of sea water that moves in a single direction inside the housing 110 and post 120, the flow mass may be calculated simply based on the inner diameter of the housing 110 and the post 120 and the height of the water filled. Furthermore, by the kinetic correlation between the housing 110 and the post 120, the effects of the added mass and flow quantity mass would be connected organically by the ratio of cross-sectional area of each element, and have correlations as in math equations 4 and 5.

$$\{m_{add1} + \rho S_1(H_1 - z_1)\}\ddot{z}_1 - \rho S_1 \dot{z}_1^2 + b_1 \dot{z}_1 = F_{e1} - F_{\gamma 1} - \rho g S_1 z_1 + PS_1$$

$$\{m_{add2} + \rho S_2(H_2 - z_2)\}\ddot{z}_2 - \rho S_2 \dot{z}_2^2 + (\beta + b_2)\dot{z}_2 = F_{e2} - F_{\gamma 2} - \rho g S_2 z_2 + PS_2 \quad \text{[Math equation 5]}$$

Herein, $m_{add1}$, $m_{add2}$ represent the added mass by the movement of the fluid oscillating due to the movement of the water surface inside the housing 110 and the post housing 110 and the post 120, respectively, $F_{s1}$, $F_{s2}$ represent the excitation force(actual driving power of the system) transferred to the housing 110 and the post 120 by movement of the waves, respectively, $F_{s1}$, $F_{s2}$ represent the radiant damping force, respectively, $\rho g S_1 z_1$, $\rho g S_2 z_2$ represent the hydrostatic force (corresponds to the spring effect in the system), respectively, P represents the inner air pressure, and ρ represents the density of water.

A fundamental kinetic equation is based on a moving object, but in the case of an oscillating water column type wave energy converting apparatus 100 according to an exemplary embodiment of the present disclosure, since there is no moving object besides the water inside the housing 110 and the post 120, it is possible to establish a kinetic equation based on the inner water level inside the housing 110 and the post 120.

The above math equations 4 and 5 must satisfy the constraint conditions of math equation 6 below on the premise of imcompressibility against inner air pressure.

$$S_1 z_1 + S_2 z_2 = \text{const} \quad \text{[Math equation 6]}$$

Herein, const represents a constant.

Using the above math equation 6, the water surface equations of math equation 4 and 5 may be integrated into one as math equation 7 as shown below.

$$M(z_2)\ddot{z}_2 + N\dot{z}_2^2 + F_r + (\beta + b)\dot{z}_2 + Kz_2 = F_e \quad \text{[Math equation 7]}$$

Herein, $M(z_2)$, N, K, b, $F_\gamma$, $F_s$ are expressed as math equations 1 to 8, respectively, as shown below.

$$M(z_2) = s_{21}^2\{(m_{add1} + \rho S_1(H_1 - z_1)\} + m_{add2} + \rho S_2(H_2 - z_2) \quad \text{[Math equation 8]}$$

$$N = \rho S_2(1 - s_{21}^2) \quad \text{[Math equation 9]}$$

$$F_\gamma = s_{21}^2 F_{\gamma 1} + F_{\gamma 2} \quad \text{[Math equation 10]}$$

$$b = s_{21}^2 b_1 + b_2 \quad \text{[Math equation 11]}$$

$$F_e = -s_{21} F_{e1} + F_{e2} \quad \text{[Math equation 12]}$$

$$K = \rho g S_2(s_{21} + 1) \quad \text{[Math equation 13]}$$

Herein, represents $s_{21}$ the ratio of $S_2$ and $S_1$ (that is, $S_2/S_1$), and is assumed to be less than 1. Therefore, the lesser this value, the lesser effect there would be from added mass and flow mass of the housing 110.

The abovementioned math equation 7 becomes the kinetic equation of the oscillating water column type wave energy converting apparatus 100, and the mass $M(z_2)$ and the spring effect K determine the resonance conditions. That is, the abovementioned math equation 3, that is the resonance condition must be satisfied. The abovementioned math equation 3 may be expressed as math equation 14 as shown below.

$$T_{wave} = 2\pi\sqrt{\frac{M_{tot}}{K_{tot}}} \to \omega^2 M(z_2) = K, \omega = \frac{2\pi}{T_{wave}}$$ [Math equation 14]

Based on the abovementioned math equation 14, it is possible to quantify the numerical value of each element of the oscillating water column type wave energy converting apparatus 100.

First of all, $M(z_2)$ in math equation 14 is a value that changes because it includes a value of water level. Therefore, calculation is to be made supposing that this value is an average value. The average value is $z_1$, $z_2$, and means 0 for convenience sake. That is, it becomes $M(0)$, and can be simplified as in math equation 15 as shown below.

$$M(0) = s_{21}^2\{m_{add1} + \rho S_1 H_1\} + m_{add2} + \rho S_2 H_2$$ [Math equation 15]

As aforementioned, the most important element that determines the kinematic parameters of the oscillating water column type wave energy converting apparatus 100 is the resonance condition. Therefore, the most important thing is to find a parameter that could satisfy the abovementioned math equation. However, since added mass $m_{add1}$, $m_{add2}$ must be obtained based on ocean engineering simulators and hydraulic equations, it is not easy to find such parameters.

Meanwhile, the assumption that $S_{21}$ is smaller than 1 is helpful for excluding several elements that affect resonance conditions. Since the added mass and flow mass by the housing 110 is multiplied by a spare of $S_{21}$ in the equation, its effect decreases. If only $S_{21}$ is 0.3, its effect would decrease to a square of 0.3, that is to approximately 0.1. From the assumption that $S_{21}$ is a small value, it would be possible to assume that the effect by the housing 110 is small enough to be disregarded. In addition, when compared to the flow mass inside the post 120, the added mass is extremely smaller than the flow mass. Consequently, the mass element that affects the resonance can be limited to flow mass inside the post 120. Since this value can be obtained from the size of the inner space only, there is no need to figure out an additional complicated hydraulic equation or ocean engineering simulator. Therefore, a resonance correlation can be simplified as in the math equation below.

$$M(0) \approx \rho S_2 H_2$$ [Math equation 16]

By applying the abovementioned math equation 16 to math equation 14, it is possible to derive math equation 17 as shown below.

$$H_2 = \frac{g}{\omega^2}(s_{21}+1) \to H_2 = \frac{g}{4\pi^2}(s_{21}+1)T_{wave}^2 = 0.2485(s_{21}+1)T_{wave}^2$$ [Math equation 17]

Since the peak period of the sea area of installation would be given, the only remaining elements would be the length of the post 120 and $S_{21}$.

The length of the post 120 is an element that affects energy output, and this is determined by the characteristics of the sea area of installation. That is, $H_2$ is determined as math equation 12 having the maximum value.

FIGS. 6a to 6f are various graphs for explaining a process of obtaining a height of a post and a ratio of the cross sectional areas of the post and the housing, for the purpose of deriving an optimal structure of an oscillating water column type wave energy converting apparatus of FIG. 1.

Figure 6A:
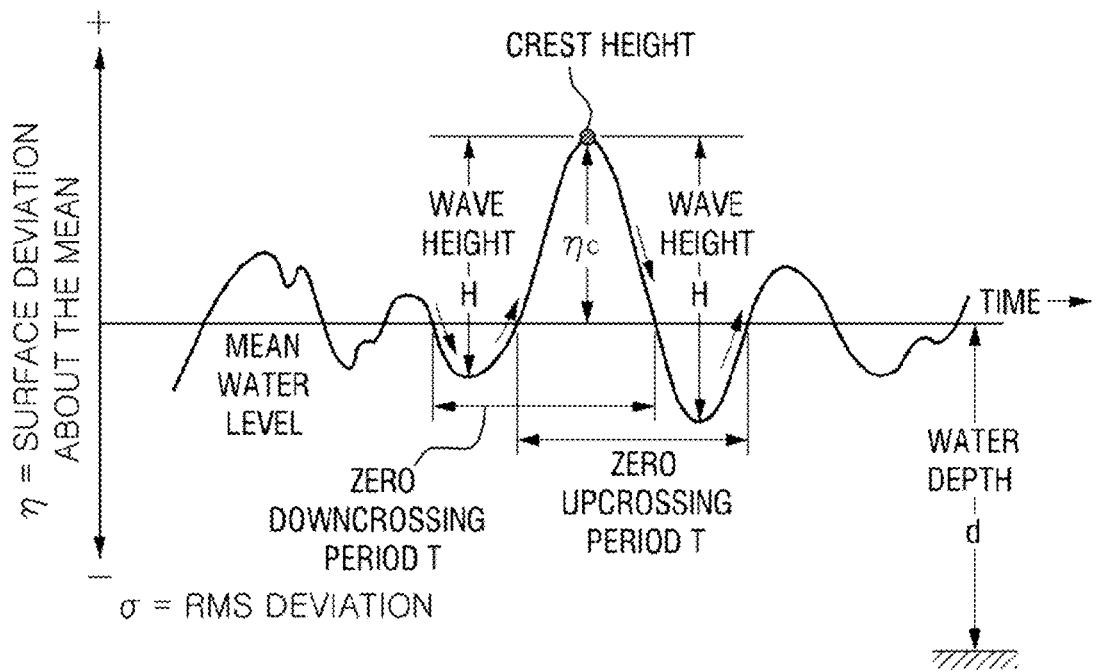
FIGS. 6a to 6f are various graphs for explaining a process of obtaining a height of the post and a ratio of the cross sectional areas of the post and the housing, for the purpose of deriving an optimal structure of an oscillating water column type wave energy converting apparatus of FIG. 1.
Figure 6B:
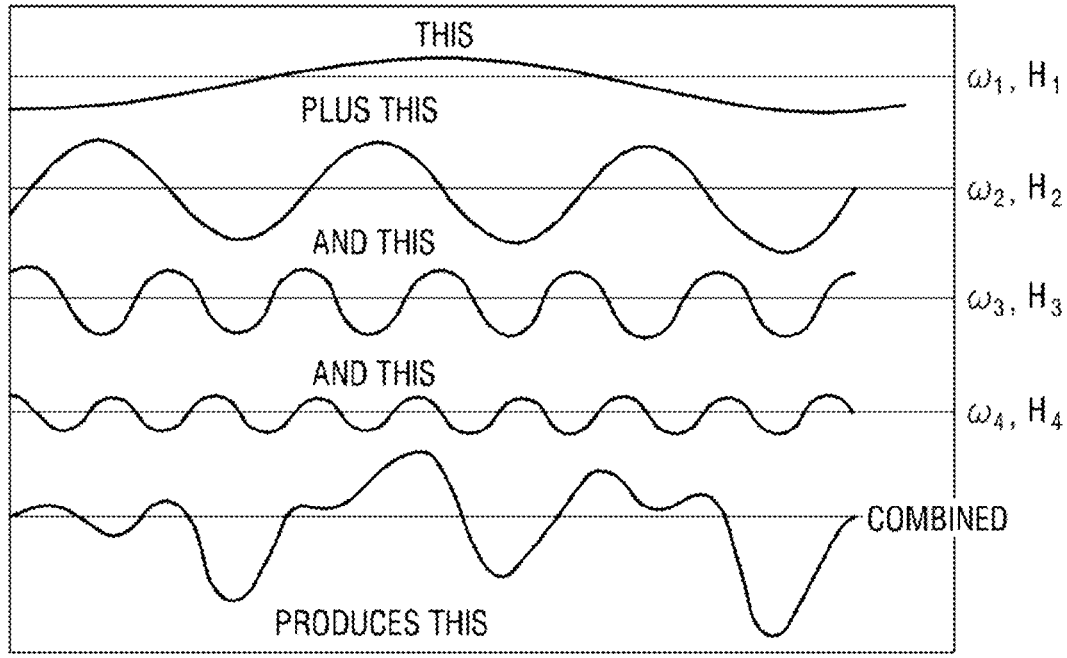

The form of waves can be explained by the principle of the probabilistic superposition of waves. The form of waves shows a significant irregularity as illustrated in FIG. 6a, but once we record the wave height and dismantle the wave form, its form would be as shown in FIG. 6b. Irregular waves may be expressed by combinations of waves having regularity. This can be expressed in an equation as in math equation 18 as below.

$$\eta = \sum_{n=1}^{N} a_n \cos\theta_n,$$ [Math equation 18]

where $\theta_n = k_n x - \omega_n t + \beta_n$, $\omega_n = 2\pi f_s n$,

Herein, $k_n$ is a wave number that is a multiple of n, x is a displacement on the horizontal plane of the sea surface, $f_s$ is a sampling frequency (smallest unit of frequency), $\beta_n$ may be any constant between $0 \sim 2\pi$, $a_n$ is the wavelength of the n multiple wave, and N may be any whole number. Usually, when it is 10 or above, waves are expressed.

This appears to be a model of irregular waves because it is expressed as a sum of cosine functions, and the status is determined randomly. However, $a_n$ and $\omega_n$ has a correlation probabilistically, and a model that shows this correlation is called a spectrum model.

In each sea area, there exists a value that is represented by a peak period and a peak amplitude, which means that probabilistically the amplitude of the sine wave of the peak period is big, and this also means that energy of waves is concentrated on this period. Hereinbelow is more detailed explanation based on the JONSWAP model which is a representative wave spectrum model.

Herein, the JONSWAP is an acronym of (JOint North Sea Wave Project), which is a mathematization of a model that matches the spectrum of the waves of the North Sea. Therefore, JONSWAP model refers to a model that explains the energy spectrum of waves. In general, waves of a sea area are extremely irregular, and it can be seen from FIG. 6b that the waves have been expressed as numerous sine waves so as to measure the irregular shape for a certain period of time. That is, the JONSWAP wave model is a model that shows how much energy is dispersed per period of a wave after classifying each sine wave per period. It means that the more the energy is distributed high waves are concentrated on the corresponding frequency (or period).

Figure 6C:
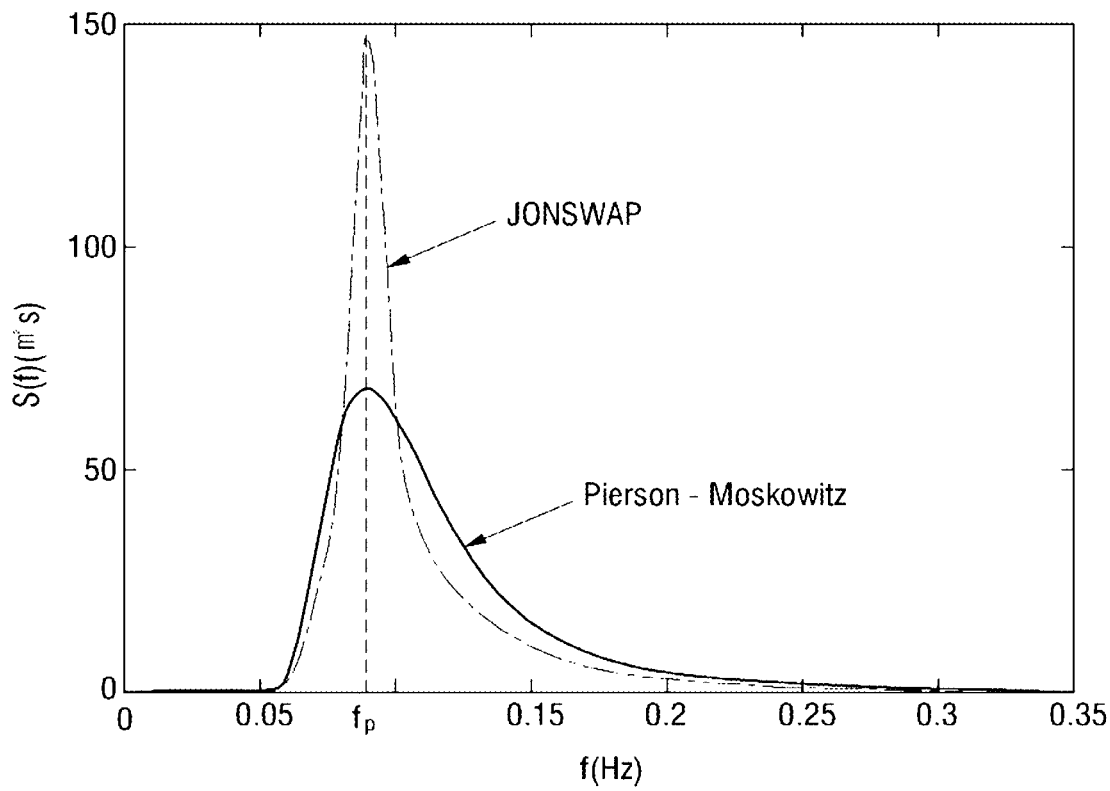

FIG. 6c illustrates a wave spectrum of a sea area having the frequency of as the representative frequency.

It can be seen that most energy is distributed in $f_p$, and that starting from this frequency, energy decreases towards both sides.

Back to the wave model, the amplitude of waves may be obtained from the square root of the area of the graph, as in math equation 19 shown below.

$$\eta = \sum_{n=1}^{N} a_n \cos\theta_n,$$ [Math equation 19]

where $\theta_n = k_n x - \sigma_n t + \beta_n$, $\sigma_n = n*\Delta\sigma$,
$a_n = \sqrt{2*\Delta\sigma*S(\sigma_n)}$,
and $\beta_n$ is randomly selected.

Figure 6D:
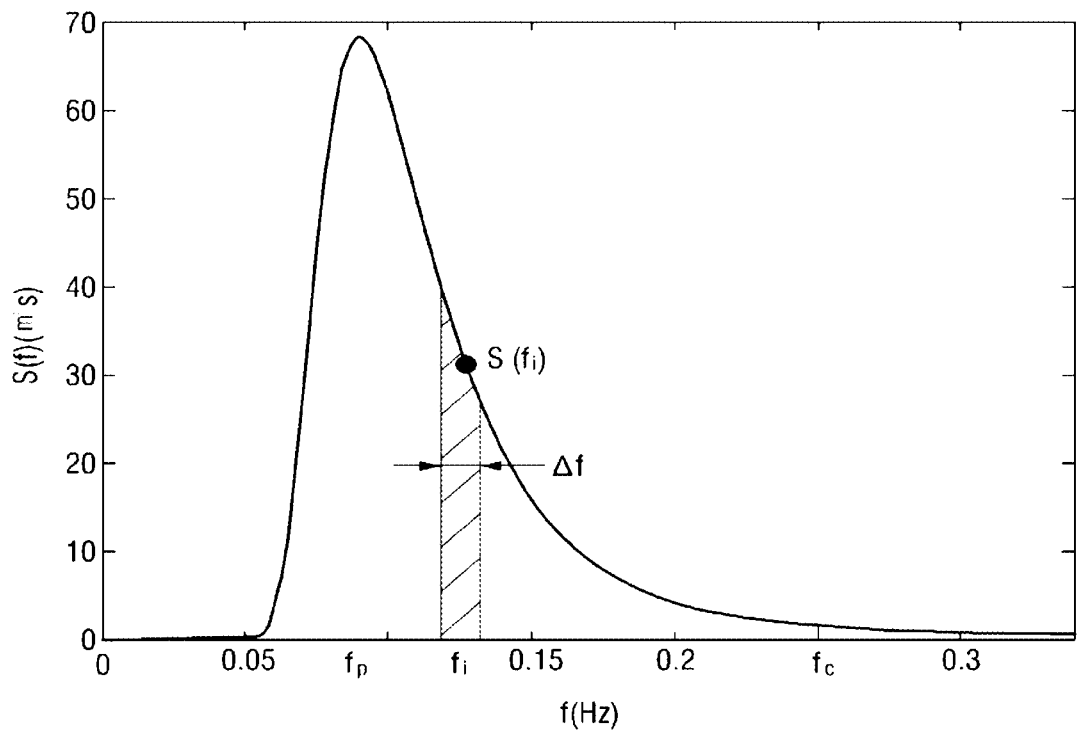
Figure 6E:
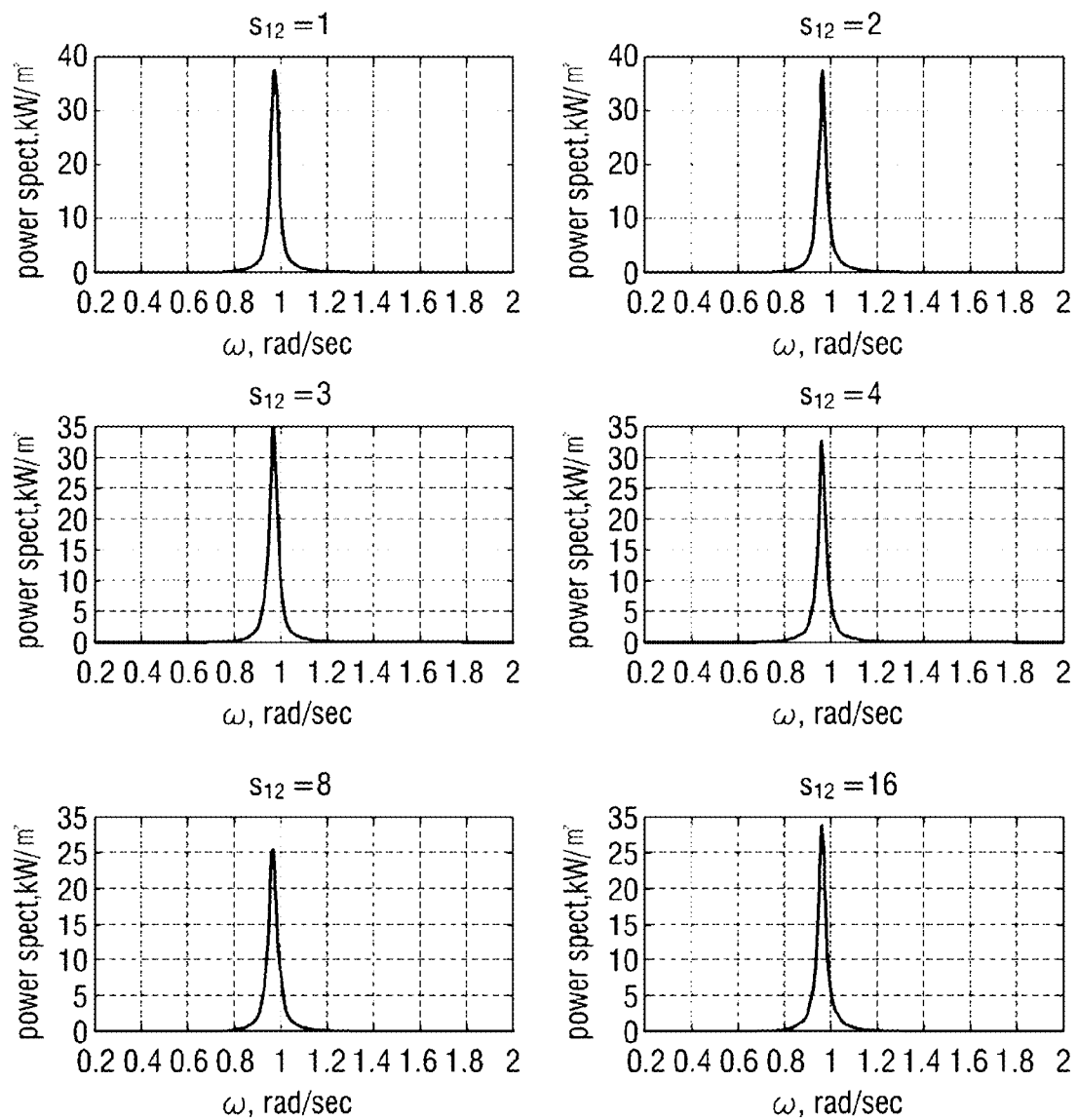
Figure 6F:
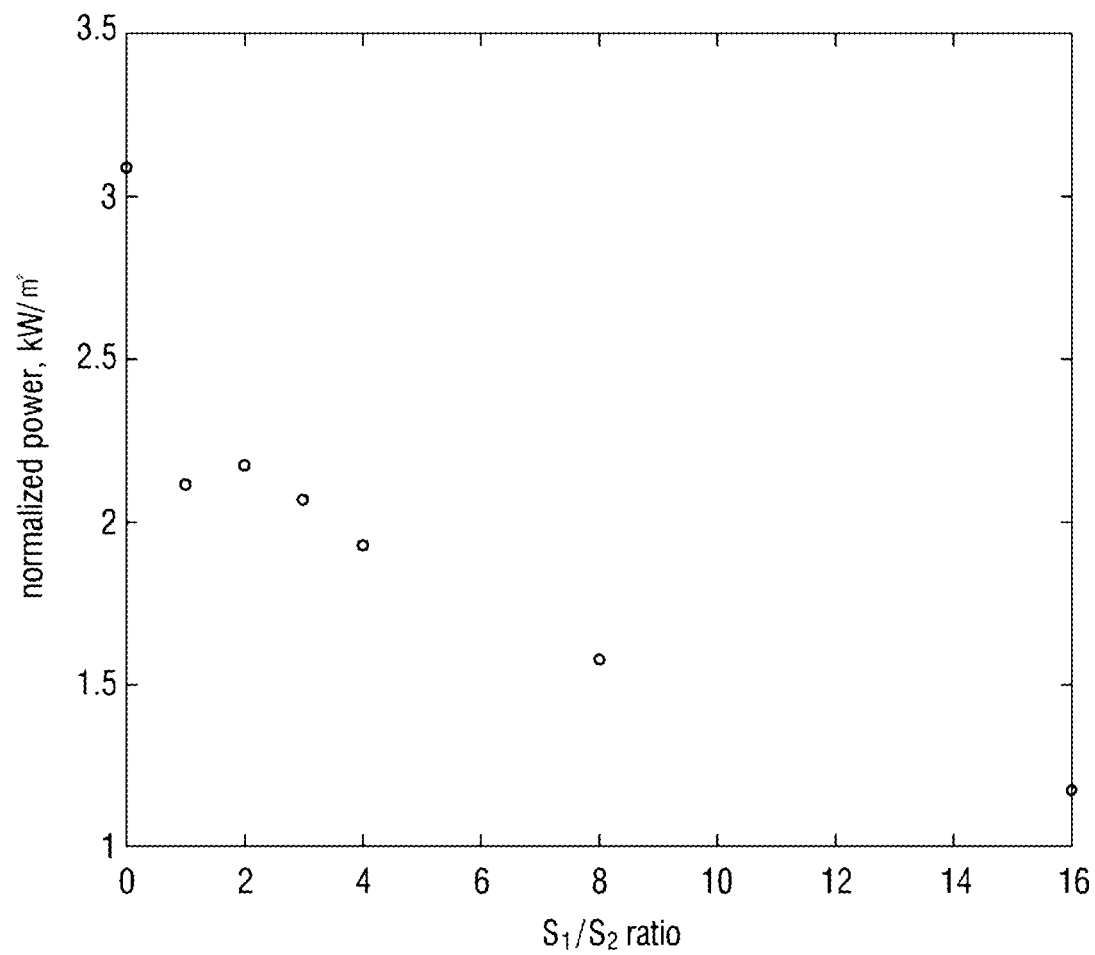

Referring to FIG. 6d, the square root of the area with deviant lines is the amplitude of the waves having the frequency of $f_i$.

Supposing the function of this spectrum is S(f), the power that can be obtained through wave power generation is as shown in math equations 20 and 21 below.

$$\overline{P} = \int_0^\infty S_p(f) df \quad \text{[Math equation 20]}$$

Herein, $S_p(f)$ means the extracted power spectrum that can be obtained theoretically, and the energy that a wave power generating apparatus can extract per frequency is expressed as being $H_{system}(f)$.

$$S_p(f) = H_{system}(f) S(f) \quad \text{[Math equation 21]}$$

Herein, $H_{system}(f)$ is called the extracted power transfer function at the frequency area of the oscillating water column type wave energy converting apparatus.

That is, much energy can be extracted when the area of the spectrum that $H_{system}(f)$ mostly has corresponds to S(f).

$H_{system}(f)$ is expressed as math equation 22 as shown below.

$$H_{system}(f) = \frac{\beta(2\pi f)^2}{2} \frac{F_e(f)^2}{\{K - (2\pi f)^2 M(f)\}^2 + \omega^2 \{F_r(f) + \beta\}^2} \quad \text{[Math equation 22]}$$

$F_e(f)$, $F_\gamma(f)$, M(f) mean the fourier transformed value of $F_e$, $F_\gamma$, $M(z_2)$. And ⊓ means the clamping coefficient of the turbine.

Hereinbelow is explanation using a simulation made on how such a transfer function value can have an effect.

In the case of performing a simulation of changing the ratio of $s_{21}$ while keeping a constant length of an existing pipe, since the resonance frequency changes, it is not possible to compare the exact performance. Therefore, what should be obtained is the length of the pipe changing as the $S_{21}$ changes with only the diameter of the pipe and the resonance period kept constant and then the changes of performance should be observed. However, the added mass effect is trivial and should thus be disregarded.

First, a calculation is to be made with f set to 0.16 Hz ($\omega=1$ rad/s). Disregarding the added mass and the amount of water in the housing, a correlation as in math equation 23 will be satisfied.

$$\omega^2 = \frac{g}{l_2}(1 + s_{21}) \quad \text{[Math equation 23]}$$

Therefore, with numbers substituted thereto, a correlation will be established as in math equation 24.

$$l_2 = \frac{g}{\omega^2}\left(1 + \frac{1}{s_{12}}\right) = 9.8\left(1 + \frac{1}{s_{12}}\right) \quad \text{[Math equation 24]}$$

(but, $s_{12} = 1/s_{21}$)

The smaller the area of the housing, the smaller the value of $S_{12}$, and thus the length of the post gets longer. Since the length of the post changes, calculation is to be made based on the diameter of the post. Supposing the diameter of the post is 2, the remaining parts in proportion to the diameter of the post is as in table 1.

TABLE 1

| $s_{12}$ | Diameter of post | Length of pipe | Diameter of housing | Depth of installation |
|---|---|---|---|---|
| 1 | 2 | 24.6 | 2.828427 | 5 |
| 2 | 2 | 19.7 | 3.464102 | 5 |
| 3 | 2 | 18.07 | 4 | 5 |
| 4 | 2 | 17.25 | 4.472136 | 5 |
| 8 | 2 | 16.025 | 6 | 5 |
| 16 | 2 | 15.4125 | 8.246211 | 5 |

A simulation was performed based on the supposition that the depth of installation was 2 m where the depth of water was 50 m. First of all, the transfer function shows a result as in FIG. 6e. Since from among the elements for maximum extraction, the damping coefficient also has an effect, only the results of maximum extraction made by applying various damping coefficients (1~2000) have been sorted out.

Then, the JONSWAP spectrum was multiplied. The peak period of this spectrum was set to 0.98 sec. The results at an environment of a sea depth of 5 m are as in FIG. 6f.

Intuitively, it means that the greater the value of $S_{12}$, the greater the cross-sectional area of the housing, and thus it can be thought that much force will be received from greater area and thus show a greater power extraction but it can be seen that this is not the case. The reason can be found from the characteristics of H_system.

Referring to the abovementioned math equation 22, the point where the maximum extraction can be obtained is determined by the values of the left section of the denominator $\{K-(2\pi f)^2 M(f)\}^2$ and $\omega^2\{F_r(f)+\beta\}^2$. That is, the maximum extraction is obtained at the point where the left section of the denominator is 0, at ratio of effect of the left section and the right section differs significantly according to $S_{12}$. Looking at the effects near the resonance period where the left section is 0, the greater the value of $S_{12}$, the more sharply the effect of the left section would increase. Therefore, the greater the value of $S_{12}$, energy would not be transferred well in areas other than resonance, whereas the smaller the value of $S_{12}$, the more easily would the energy be transferred in the area surrounding the resonance period. Therefore, the appropriate value of $S_{12}$ would be between about 1 and 4, and when $S_{12}$ is over 4, the efficiency would decrease significantly.

By deriving a parameter, an oscillating water column type wave energy converting apparatus 100 having a simple structure consisting of a housing 110, post, 120, turbine 130, and damping plate 140 may be installed underwater by a mooring device 205.

Figure 7:
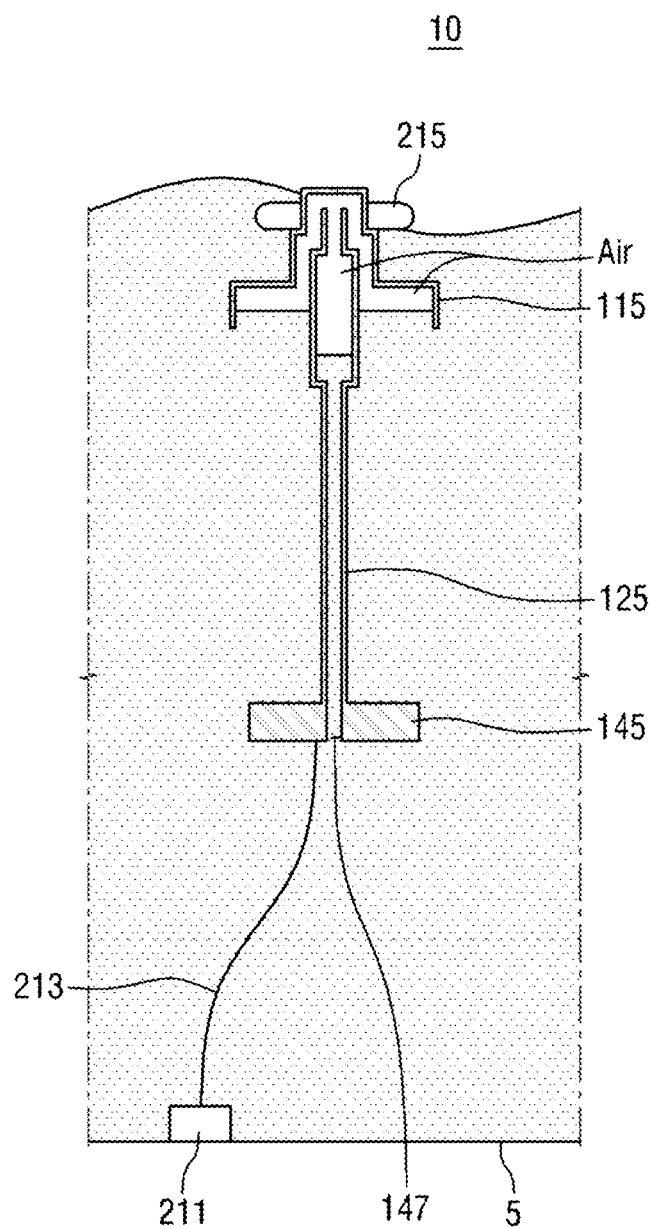
FIG. 7 is a cross-sectional view of an oscillating water column type wave energy converting system according to an exemplary embodiment of the present disclosure.
Figure 8:
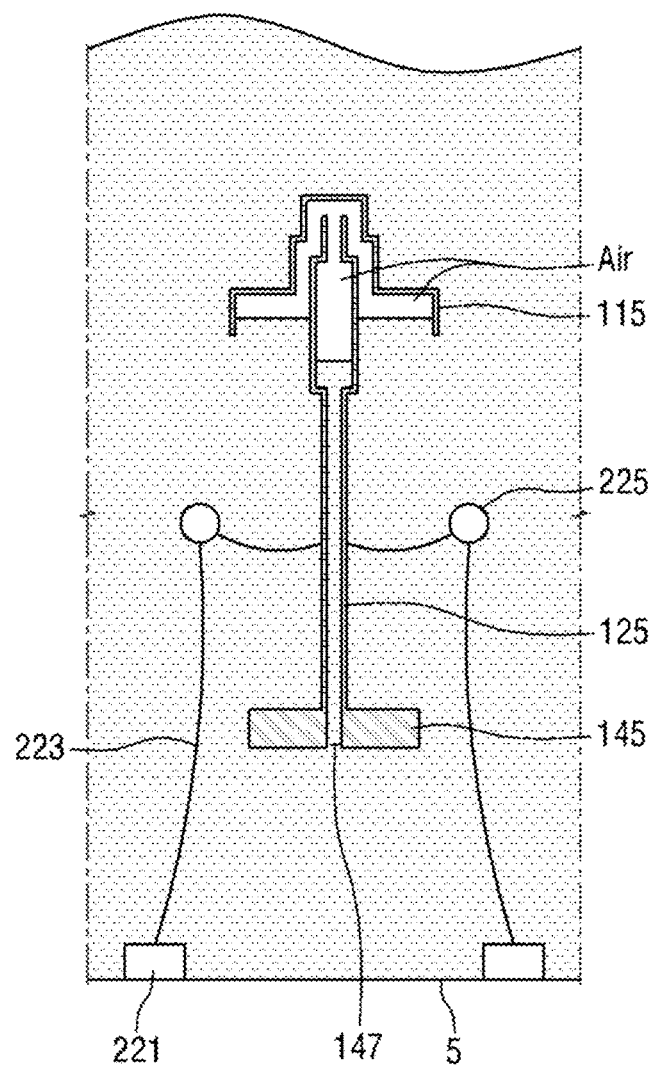
FIG. 8 is a cross-sectional view of an oscillating water column type wave energy converting system according to another exemplary embodiment of the present disclosure.

FIG. 7 is a cross-sectional view of an oscillating water column type wave energy converting system according to an exemplary embodiment of the present disclosure. In addition, FIG. 8 is a cross-sectional view of an oscillating water column type wave energy converting system according to another exemplary embodiment of the present disclosure. Furthermore, FIG. 9 is a cross-sectional view of an oscillating water column type wave energy converting system according to another exemplary embodiment of the present disclosure.

Figure 9:
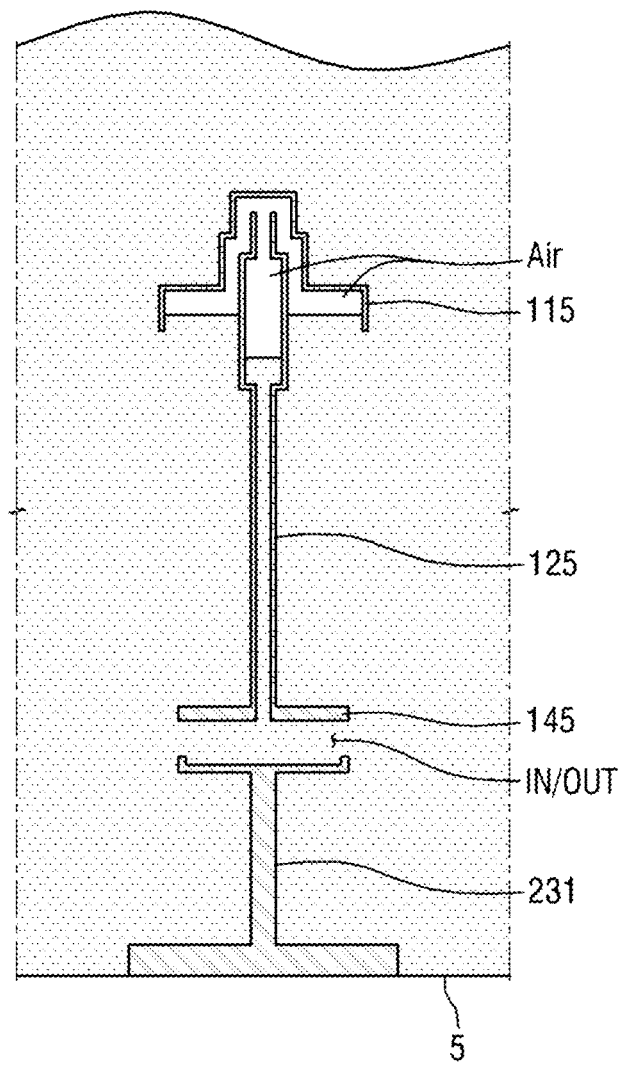
FIG. 9 is a cross-sectional view of an oscillating water column type wave energy converting system according to another exemplary embodiment of the present disclosure.

With reference to FIGS. 7 to 9, an oscillating water column type wave energy converting system 10, 20, 30 comprises a wave energy converting apparatus and mooring device. Herein, the wave energy converting apparatus comprises a housing 115 of which a lower end is open, an damping plate 145 comprising an insertion hole 147, a post 125 having a hollow inserted into the insertion hole 147 of the damping plate 145 and extending inside an inner space of the housing 115, and a turbine 135 that is disposed in the hollow of the post 125 and that is rotated by air that flows according to changes in water level of the hollow. In addition, the mooring device fixates the wave energy converting apparatus so as to prevent the wave energy converting apparatus from drifting away. Herein, by the mooring device, the wave energy converting apparatus may be suspended on a sea surface, underwater, or on a sea bottom. Depending on the structure of the mooring device, the installation location may differ. In addition, there may be further included a generator 155 connected to the turbine 135 of the wave energy converting apparatus.

The housing 115 has a greater diameter than the post 125, and may surround a portion of an upper end of the post 125. In addition, it is preferable, but is not limited thereto, that the upper end of the housing 115 is blocked and the lower end is a cylinder shape hollow structure. The material of the housing 115 may be incorrodible stainless or paint coated with steel, or synthetic resin having excellent mechanical strength, or any other material that may tolerate sea water. In addition, the housing 115 contains air in its inner upper space, and by the interaction between the air pressure and water pressure, the water inside the post 125 moves up and down.

The damping plate 145 has a discal shape, and it is preferable that an insertion hole 147 is disposed in the center of the damping plate 145. The damping plate 145 and waves may prevent the housing 115 and the post 125 from moving up and down. In addition, the damping plate 145 acts as a weight pendulum to play a role of controlling the main body consisting of the housing 115 and the post 125 to maintain its vertical posture.

The post 125 may have a cylinder shape, but it is not limited thereto. Herein, the upper end of the post 125 is distanced from the housing 115, and may brim over with water. The post 125 may be a hollow pipe disposed at the lower end of the housing 115. The upper end of the post 125 and the housing 115 are distanced from each other and are fixated that way, and thus air may freely enter and exit from the inside of the housing and the upper end of the post 125. The damping plate 145 is disposed at the lower end of the post 125 so that the post 125 may move with stability.

The turbine 135 is disposed inside the post, that is in the hollow, and is rotated by the movement of air flowing due to changes in water level inside the post 125. Then electricity is generated through the generator 155 connected to the turbine. Herein, in the case of using a single direction turbine such as a wells turbine, the turbine may be rotated in one direction only even when the movement direction of the air changes, thereby generating electricity with stability. Of course, other kinds of turbines such as impulse turbines may also be used instead of wells turbines. Especially, it is preferable that the turbine 135 is disposed at the upper end of the post 125 surrounded by the housing 115.

The mooring device plays a role of holding the wave energy converting apparatus so that it does not drift away. The wave energy converting apparatus may be suspended underwater when the buoyancy by the air inside the housing 115, weight of the wave energy converting apparatus, and the tension acting on the wave energy converting apparatus by the mooring apparatus establish an equilibrium.

There are three ways that the wave energy converting apparatus may be installed by the mooring device. Accordingly, there may be three types of oscillating water column type wave energy converting systems 10, 20, 30.

In FIG. 7, the mooring device may comprise a first support 211 that is installed and fixated on the sea bottom 5, and a first connecting line 213 that connects the first support 211 with the damping plate 145. Herein, the mooring device may further comprise a main buoy 215 that is connected to the housing 115 and exposes a portion of the housing above the sea surface. That is, when buoyancy is obtained by mounting an additional main buoy 215 on an upper end of the housing 115, the apparatus may be suspended with a portion of the upper end of the housing 115 being exposed above the sea surface. However, this is different from prior art in that only an extremely small portion is exposed above the sea surface, that is, most of the structure is disposed below the sea surface. Ropes or chains connected to the first support 211 installed on the sea bottom may be used as the first connecting line 213 for preventing the apparatus from drifting away. Herein, instead of using the main buoy 215, it is possible to fill sufficient air inside the housing 115 and obtain buoyancy, and have the apparatus be suspended underwater with a portion of the upper end of the housing 115 being exposed above the sea surface.

Referring to FIG. 8, the mooring device may comprise a second support 211 that is installed and fixated on the sea bottom 5, a second connecting line 223 that connects the second support 221 and the post 125, and a subsidiary buoy 225 connected to the second connecting line 223. When the buoyancy caused by the air inside the housing 115 is greater than the weight of the wave energy converting apparatus, the wave energy converting apparatus rises to the sea surface, and thus in order to prevent such rising of the apparatus, the apparatus is fixated on the sea bottom 5 by the second support 221 and the second connecting line 223 so that the apparatus can be suspended underwater. The second connecting line 223 and the first connecting line 213 may also be ropes or chains. These ropes or chains tend to droop due to their weight, and thus they may collide with the damping plate 145. That is why the subsidiary buoy 225 is hung in the middle of a rope or chain to prevent collision.

Referring to FIG. 9, the mooring device may comprise a third support 231 to which the damping plate 145 is connected and fastened, and installed and fixated on the sea bottom 231. This is to make the structure stand on the sea bottom 5 without any connecting line such as a rope or chain and to fixate the wave energy converting apparatus. Herein, when connecting the damping plate 145 and the third support 231, there should be space left for water to go in and out freely.

Figure 10:
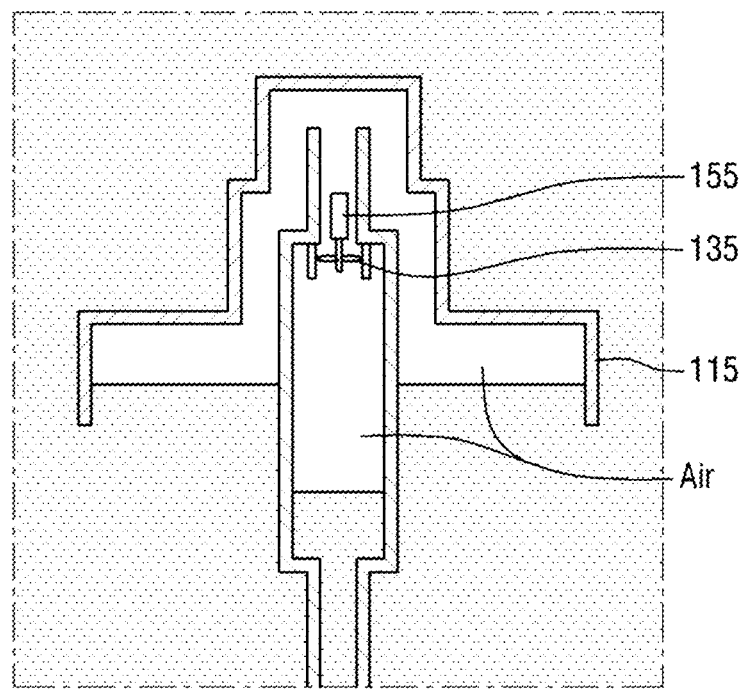
FIG. 10 is a partial cross-sectional view illustrating a generator at least one connected to a turbine from among oscillating water column type wave energy converting systems of FIGS. 7 to 9.

FIG. 10 is a partial cross-sectional view illustrating a generator at least one connected to the turbine from among an oscillating water column type wave energy converting system of FIGS. 7 to 9.

The turbine 135 is connected directly to the generator 155 so that the generator 155 can receive the rotation movement energy from the rotation made by the turbine 135 and convert it into electric energy.

The oscillating water column type wave energy converting systems 10, 20, 30 illustrated in FIGS. 7 to 9, respectively, are designed in accordance with the aforementioned resonance conditions so as to have the resonance frequency corresponding to the peak frequency of the waves of the sea area where the apparatus is installed, as it is with the aforementioned wave energy converting apparatus 100. Specific explanation thereof is as aforementioned and is thus omitted.

Figure 11A:
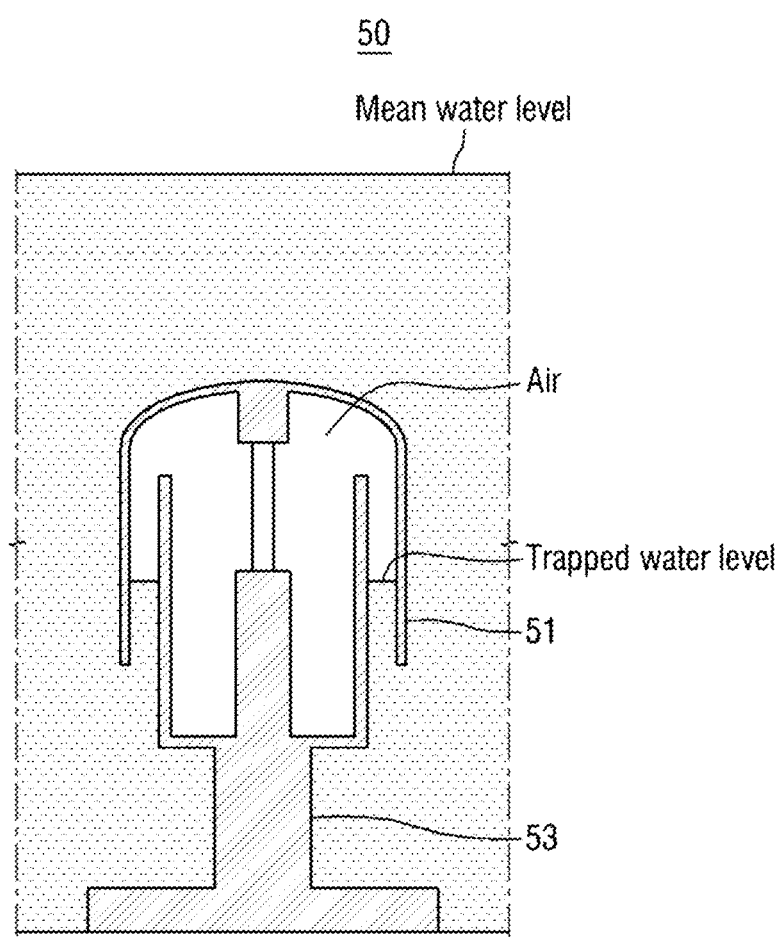
FIG. 11a and FIG. 11b are cross-sectional views each illustrating conventional wave energy converting system at a wave height equilibrium state and an oscillating water column type wave energy converting system of FIG. 7 at a wave height equilibrium state, respectively.
Figure 11B:
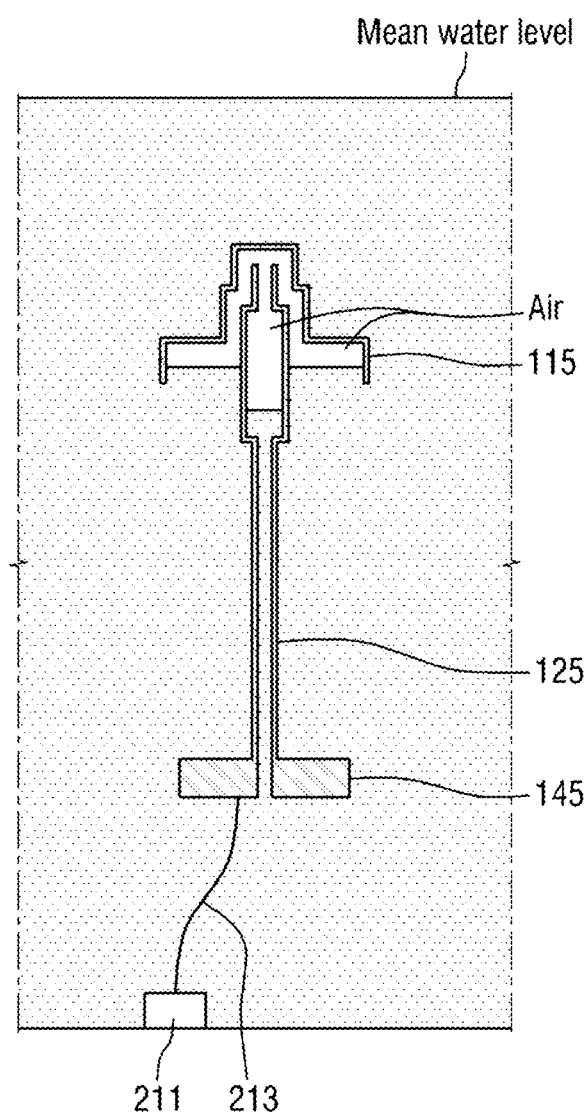
Figure 12A:
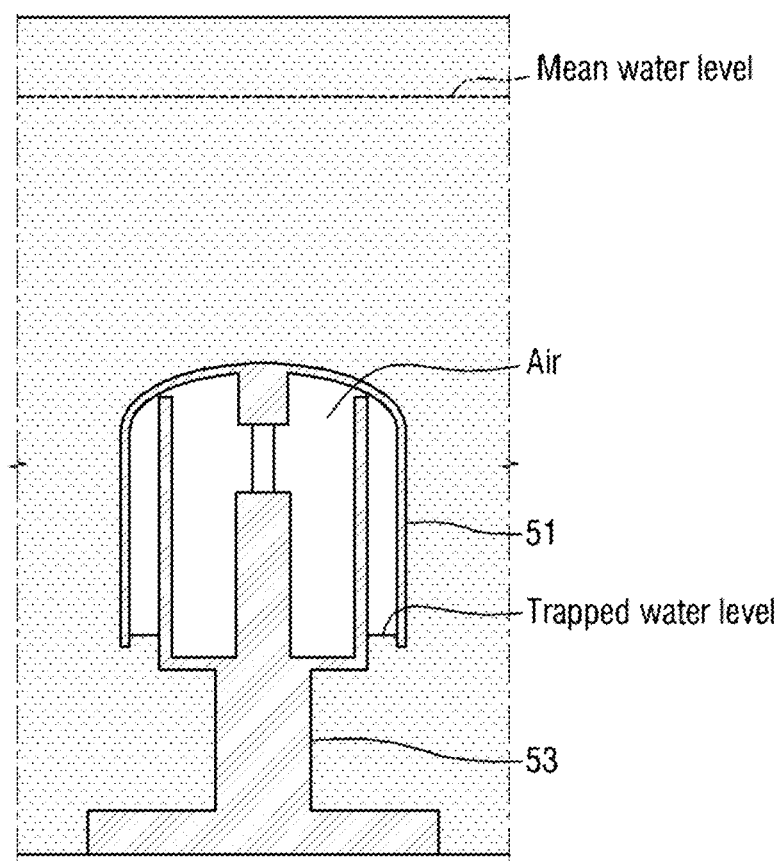
FIG. 12a and FIG. 12b are cross-sectional views each illustrating a conventional wave energy converting system at a wave height crest state and an oscillating water column type wave energy converting system of FIG. 7 at a wave height crest state, respectively.
Figure 12B:
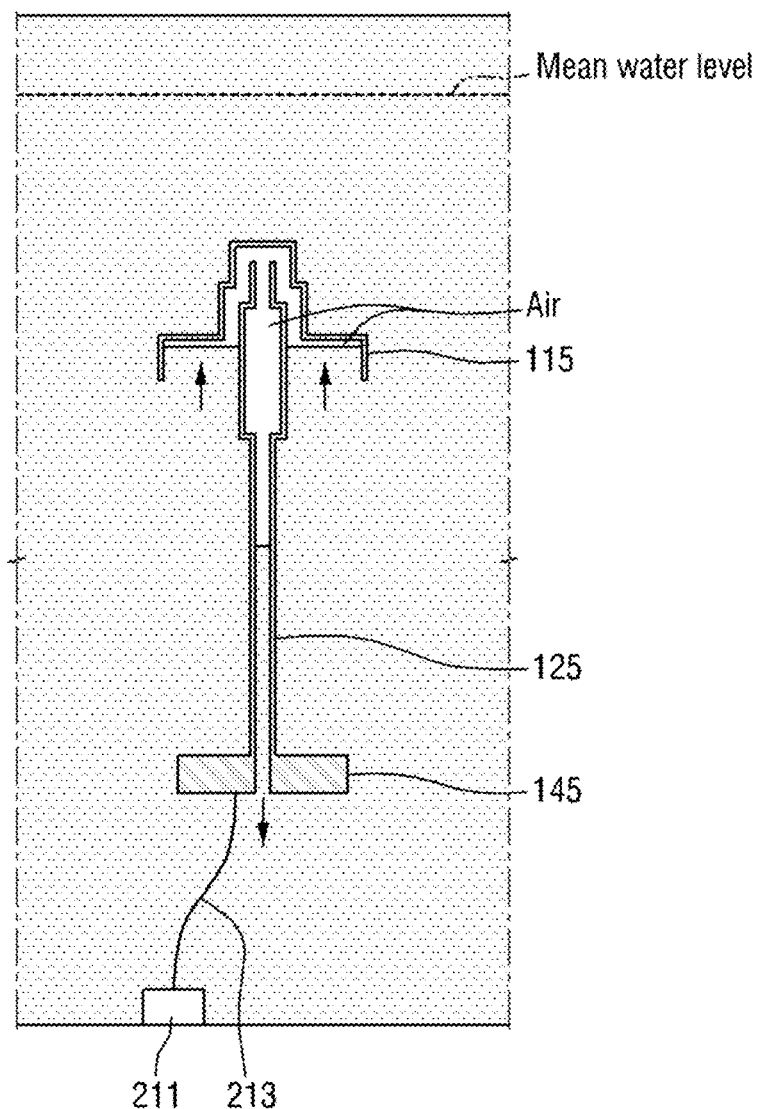
Figure 13A:
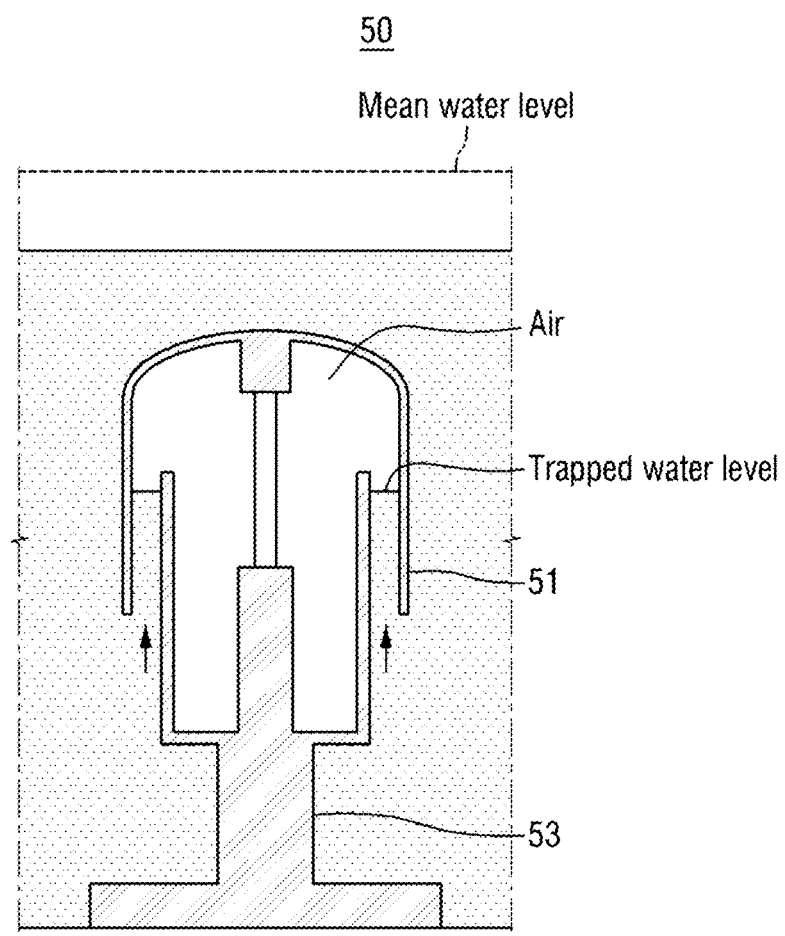
FIG. 13a and FIG. 13b are cross-sectional views each illustrating a conventional wave energy converting system at a wave height trough state and an oscillating water column type wave energy converting system of FIG. 7 at a wave height trough state, respectively.
Figure 13B:
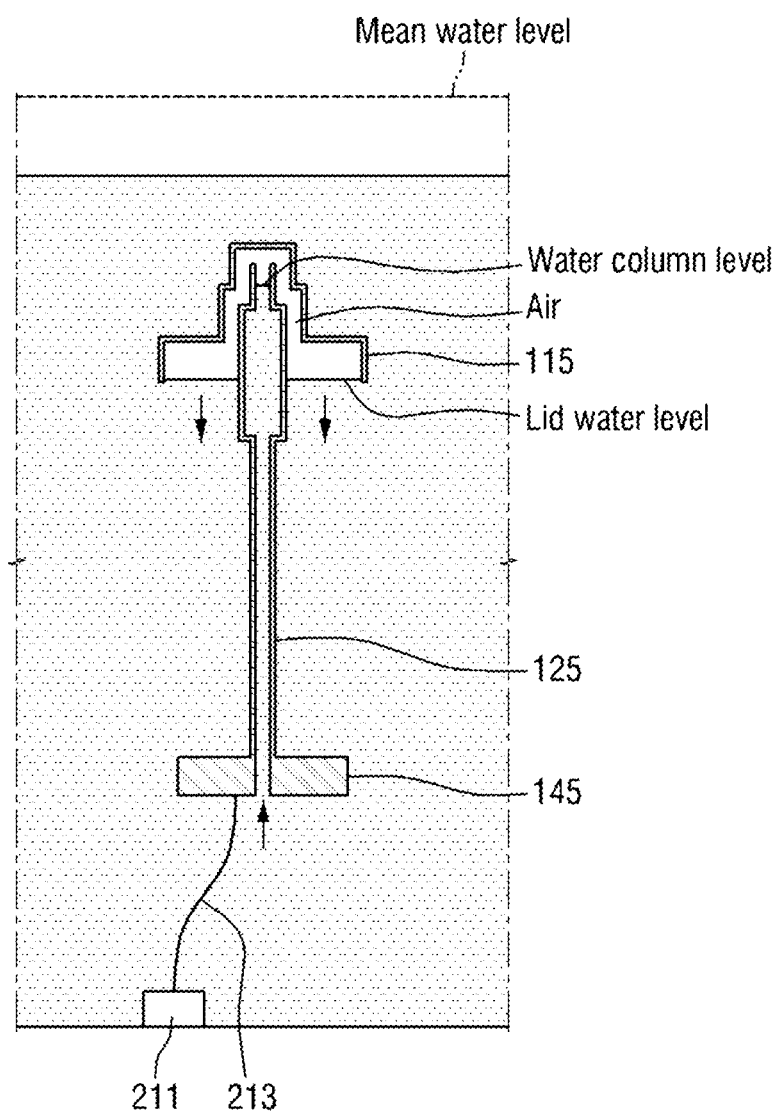

FIG. 11a and FIG. 11b are cross-sectional views each illustrating conventional wave energy converting system at a wave height equilibrium state and an oscillating water column type wave energy converting system of FIG. 7 at a wave height equilibrium state, respectively. Furthermore, FIG. 12a and FIG. 12b are cross-sectional views each illustrating a conventional wave energy converting system at a wave height crest state and an oscillating water column type wave energy converting system of FIG. 7 at a wave height crest state, respectively. In addition, FIG. 13a and FIG. 13b are cross-sectional views each illustrating a conventional wave energy converting system at a wave trough state and an oscillating water column type wave energy converting system of FIG. 7 at a wave trough state, respectively.

With reference to FIG. 11a and FIG. 11b, at an equilibrium state with no waves, in a conventional wave energy converting system 50, the oscillating subject would be the lid 51, the driving power would be changes in water level caused by waves, and the direction of the driving power would be vertically downwards. On the other hand, in the oscillating water column wave energy converting system 10 according to an exemplary embodiment of the present disclosure, the oscillating subject would be water, and the driving power would be changes in water level caused by waves as well, but the direction of the driving power would be vertically upwards.

Therefore, in a conventional wave energy converting system 50, since the direction of the driving power is vertically downwards, a vertical drag would be needed, for example a strong structure of silo 53. Accordingly, installation costs would rise. On the other hand, an oscillating wave energy converting system 10 according to an exemplary embodiment of the present disclosure may be suspended depending on the tension of the mooring device 211, 213, thereby saving installation costs.

With reference to FIG. 12a and FIG. 12b, when a wave height rises, the water pressure rises as well. In the case where the water pressure rises according to the rise of a wave height in a conventional wave energy converting system 50, the oscillating subject, lid 51, would drop, and the trapped water level would drop. On the other hand, in the case where the water pressure rises according to the rise of a wave height in an oscillating water column type wave energy converting system 10 according to an exemplary embodiment of the present disclosure, the sea level inside the housing 115 would rise, and as the pressure of inner air increases accordingly, the water level of the water column of the post 125 would drop.

Therefore, in the case where a wave height rises in a conventional wave energy converting system 50, there is a problem that the spring coefficient of the hydrostatic force may have a negative value, and also that, if the spring coefficient of the inner air pressure is smaller than the absolute value of the spring coefficient of the hydrostatic force, it cannot return to the original point. In order to prevent this, a conventional wave energy converting system 50 would need an apparatus for controlling the volume of the inner air, and an additional mechanical spring. Furthermore, if the inner sea level becomes too low in a conventional wave energy converting system 50, air may leak. And thus the movement of the lid 51 must be observed, and there is required a structure to act as a brake.

On the other hand, in the case where a wave height rises in an oscillating water column type wave energy converting system 10 according to an exemplary embodiment of the present disclosure, the hydrostatic force would be a positive value, and thus no additional spring would be needed. Furthermore, even if the water level inside the housing 115 rises too high, water would flow inside and there would be no leak of air. Therefore, there is no need for an additional apparatus for controlling the water level.

With reference to FIG. 13a and FIG. 13b, when a wave height drops, the water pressure drops. In the case where the water pressure drops according to a drop of a wave height in a conventional wave energy converting system 50, the oscillating subject, the lid 51, would rise, and the trapped water level would rise accordingly. On the other hand, in an oscillating water column type wave energy converting system 10 according to an exemplary embodiment of the present disclosure, when the water pressure drops according to a wave height drop, the water level inside the housing 115 would drop, and as pressure of the inner air would drop accordingly, the level of the water column of the post 125 would rise.

Therefore, in a conventional wave energy converting system 50, when a wave height rises, there is a problem that water may flow inside when the trapped water level rises too high. In order to prevent this, a conventional wave energy converting system 50 would require observation on the movement of the lid 51, and a structure to act as a brake.

On the other hand, when a wave height drops in an oscillating water column type wave energy converting system 10 according to an exemplary embodiment of the present disclosure, even if the water column inside the post 125 rises, water would brim over inside the housing 115, and thus there would be no leak of air. Thus, there is no need for an additional apparatus for controlling the water level.

The following is a table that shows the aforementioned differences between a conventional wave energy converting system 50 and an oscillating water column type wave energy converting system 10 according to an exemplary embodiment of the present disclosure

TABLE 3

| | | Conventional system (50) | System according to an exemplary embodiment of the present disclosure (10) |
|---|---|---|---|
| Oscillation | Oscillating subject | Lid (51) | Sea water |
| | Requirements | Needs an additional apparatus for moving the lid 51 only vertically | No need for an additional apparatus |
| Driving power | Direction of driving power | Vertically downwards | Vertically upwards |
| | Requirements | Strong support (Silo, 53) Additional apparatus for controlling the inside volume (generally, tire volume is controlled by filling water inside) Additional mechanical spring | No need for an additional apparatus besides the mooring device |

TABLE 3-continued

|  |  | Conventional system (50) | System according to an exemplary embodiment of the present disclosure (10) |
|---|---|---|---|
| Water tight | Water tight method | There is trapped water level between the lid 51 and silo 53 by maintaining the inner pressure | Inner air pressure identical to water pressure |
|  | Requirements | Needs a brake to limit the maximum amplitude of the lid in order to prevent water from brimming over inside or to prevent air from leaking according to the movement of the lid 51. | No need for an additional brake since the water level inside the post 125 would brim over inside the housing 115 even if it exceeds the amplitude limitation |

Accordingly, an oscillating water column type wave energy converting system 10, 20, 30 of the present disclosure does not require an additional spring, and depends on only a hydraulic spring constant and added mass by movement of water to match the unique period to the peak period of waves in the sea area of installation. In addition, when such a system is installed above the sea surface, it may be damaged or lost due to marine disasters such as high winds or seismic sea waves, but an oscillating water column type wave energy converting system 10, 20, 30 of the present disclosure is installed underwater and the structure is not directly exposed above sea surface. Therefore, the oscillating water column type wave energy converting system has strong resistance against marine disasters such as high winds, typhoons, and seismic sea waves. Furthermore, since there is no need for low dry weight components such as a bushing or LM for limiting movement, the structure becomes very simple. In addition, since it is possible to concentrate flow of fluid on one place through a kinematic design, the amplitude may be maximized, thereby guaranteeing a high energy conversion efficiency. Moreover, since there is no need for additional space for resonance conditions, the volume of the system may be reduced, increasing the volume efficiency. There are numerous advantages such as low dry weight, simple structure, inexpensive manufacturing and installation costs due to high volume efficiency, easy transfer, and easy repair and maintenance since all parts except for the generator are components like pipes.

Although a few embodiments of the present invention have been shown and described, it would be appreciated by those skilled in the art that changes may be made in this embodiment without departing from the principles and spirit of the invention, the scope of which is defined in the claims and their equivalents.

DESCRIPTION OF REFERENCE NUMERALS

100: OSCILLATING WATER COLUMN TYPE WAVE ENERGY CONVERTING APPARATUS
110: HOUSING
120: POST
130: TURBINE
140: DAMPING PLATE
10, 20, 30: OSCILLATING WATER COLUMN TYPE WAVE ENERGY CONVERTING SYSTEM
115: HOUSING
125: POST
135: TURBINE
145: DAMPING PLATE
155: GENERATOR
211: FIRST SUPPORT
213: FIRST CONNECTING LINE
215: MAIN BUOY
221: SECOND SUPPORT
223: SECOND CONNECTING LINE
225: SUBSIDIARY BUOY
231: THIRD SUPPORT

What is claimed is:

1. An oscillating water column type wave energy converting apparatus that is suspended underwater by a mooring device, the apparatus comprising:
    an damping plate connected to the mooring device;
    a post with a hollow of which both ends are open, the post extending vertically upwards from the mooring device;
    a turbine disposed inside the hollow of the post; and
    a housing of which a lower end is open, the housing disposed at an upper portion of the post,
    wherein the turbine is rotated by air that flows according to changes in water level inside the hollow of the post, and
    wherein the damping plate comprises an insertion hole where the post is inserted and combined.

2. The apparatus according to claim 1, wherein the damping plate has a discal shape.

3. The apparatus according to claim 1, wherein the post has a cylinder shape.

4. The apparatus according to claim 1, wherein the turbine is a wells turbine that rotates in one direction only.

5. The apparatus according to claim 1, wherein the turbine is an impulse turbine.

6. The apparatus according to claim 1, wherein the housing has a greater diameter than the post, and surrounds a portion of an upper end of the post.

7. The apparatus according to claim 1, wherein the housing contains air in its inner upper space.

8. The apparatus according to claim 1, further comprising a generator connected to the turbine and which generates electricity by rotation of the turbine.

9. An oscillating water column type wave energy converting system, the system comprising:
    a wave energy converting apparatus comprising a housing of which a lower end is open, an damping plate comprising an insertion hole, a post having a hollow inserted into the insertion hole of the damping plate and extended to an inner space of the housing, and a turbine disposed inside the hollow of the post and is rotated by air that flows according to changes in water level inside the hollow; and a mooring device that fixates the wave energy converting apparatus and prevents the wave energy converting apparatus from drifting away, wherein the housing has a greater diameter than the post, and surrounds a portion of an upper end of the post.

10. The system according to claim 9, wherein the housing contains air in its inner upper space.

11. The system according to claim 9, wherein the damping plate has a discal shape, and has the insertion hole in its center.

12. The system according to claim 9, wherein the post has a cylinder shape, and its upper end is distanced from the housing.

13. The system according to claim 9, wherein the turbine is an impulse turbine or a wells turbine.

14. The system according to claim 9, wherein the turbine is disposed at an upper end of the post surrounded by the housing.

15. The system according to claim 9, wherein the mooring device comprises a first support installed and fixated on a sea bottom, and a first connecting line connecting the first support and the damping plate.

16. The system according to claim 15, wherein the mooring device further comprises a main buoy connected to the housing and exposing a portion of the housing above surface of sea.

17. The system according to claim 9, wherein the mooring device further comprises a second support installed and fixated on a sea bottom, a second connecting line connecting the second support and the post, and a subsidiary buoy connected to the second connecting line.

18. The system according to claim 9, wherein the mooring device further comprises a third support to which the damping plate is connected and fastened, and which is installed and fixated on a sea bottom.

19. An oscillating water column type wave energy converting system, the system comprising:

a wave energy converting apparatus comprising a housing of which a lower end is open, an damping plate comprising an insertion hole, a post having a hollow inserted into the insertion hole of the damping plate and extended to an inner space of the housing, and a turbine disposed inside the hollow of the post and is rotated by air that flows according to changes in water level inside the hollow; and a mooring device that fixates the wave energy converting apparatus and prevents the wave energy converting apparatus from drifting away, wherein the housing contains air in its inner upper space.

20. The system according to claim 19, wherein the damping plate has a discal shape, and has the insertion hole in its center.

21. The system according to claim 19, wherein the post has a cylinder shape, and its upper end is distanced from the housing.

22. The system according to claim 19, wherein the turbine is an impulse turbine or a wells turbine.

23. The system according to claim 19, wherein the turbine is disposed at an upper end of the post surrounded by the housing.

24. The system according to claim 19, wherein the mooring device comprises a first support installed and fixated on a sea bottom, and a first connecting line connecting the first support and the damping plate.

25. The system according to claim 24, wherein the mooring device further comprises a main buoy connected to the housing and exposing a portion of the housing above surface of sea.

26. The system according to claim 19, wherein the mooring device further comprises a second support installed and fixated on a sea bottom, a second connecting line connecting the second support and the post, and a subsidiary buoy connected to the second connecting line.

27. The system according to claim 19, wherein the mooring device further comprises a third support to which the damping plate is connected and fastened, and which is installed and fixated on a sea bottom.

\* \* \* \* \*